(12) United States Patent
Fama et al.

(10) Patent No.: US 8,331,549 B2
(45) Date of Patent: Dec. 11, 2012

(54) SYSTEM AND METHOD FOR INTEGRATED WORKFORCE AND QUALITY MANAGEMENT

(75) Inventors: Jason Fama, Redwood City, CA (US); Simon Shvarts, Cupertino, CA (US); Joseph Watson, Alpharetta, GA (US); Jeff Iannone, Alpharetta, GA (US)

(73) Assignee: Verint Americas Inc., Melville, NY (US)

( * ) Notice: Subject to any disclaimer, the term of this patent is extended or adjusted under 35 U.S.C. 154(b) by 1498 days.

(21) Appl. No.: 11/742,733

(22) Filed: May 1, 2007

(65) Prior Publication Data

US 2008/0002823 A1    Jan. 3, 2008

(51) Int. Cl.
*H04M 3/00* (2006.01)
*H04M 5/00* (2006.01)
(52) U.S. Cl. .............................. 379/265.06; 379/265.12
(58) Field of Classification Search ............. 379/265.06, 379/265.12; 705/9–11
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |

(Continued)

FOREIGN PATENT DOCUMENTS

EP    0453128 A2    10/1991

(Continued)

OTHER PUBLICATIONS

Non-final office action issued in U.S. Appl. No. 11/742,742 on Jan. 19, 2011, 39 pages.

(Continued)

*Primary Examiner* — Quynh Nguyen

(57) ABSTRACT

Methods and systems are presented for integrating workforce management and quality monitoring. In one embodiment, the method comprises the steps of: receiving information about a skill; capturing a plurality of contacts made by an agent; receiving an evaluation of the contacts; and updating the skill information based on the evaluation. The skill is associated with an agent, and the evaluation measures the agent skill. In another embodiment, the method comprises the steps of: receiving information about a skill; capturing a plurality of contacts made by an agent; receiving an evaluation form for the contacts; and updating the form based on the skill information. The skill is associated with an agent, and the form produces a measurement of the agent skill.

14 Claims, 15 Drawing Sheets

U.S. PATENT DOCUMENTS

| | | | |
|---|---|---|---|
| 5,388,252 | A | 2/1995 | Dreste et al. |
| 5,396,371 | A | 3/1995 | Henits et al. |
| 5,432,715 | A | 7/1995 | Shigematsu et al. |
| 5,465,286 | A | 11/1995 | Clare et al. |
| 5,475,625 | A | 12/1995 | Glaschick |
| 5,485,569 | A | 1/1996 | Goldman et al. |
| 5,491,780 | A | 2/1996 | Fyles et al. |
| 5,499,291 | A | 3/1996 | Kepley |
| 5,535,256 | A | 7/1996 | Maloney et al. |
| 5,572,652 | A | 11/1996 | Robusto et al. |
| 5,577,112 | A | 11/1996 | Cambray et al. |
| 5,590,171 | A | 12/1996 | Howe et al. |
| 5,597,312 | A | 1/1997 | Bloom et al. |
| 5,619,183 | A | 4/1997 | Ziegra et al. |
| 5,696,906 | A | 12/1997 | Peters et al. |
| 5,717,879 | A | 2/1998 | Moran et al. |
| 5,721,842 | A | 2/1998 | Beasley et al. |
| 5,742,670 | A | 4/1998 | Bennett |
| 5,748,499 | A | 5/1998 | Trueblood |
| 5,778,182 | A | 7/1998 | Cathey et al. |
| 5,784,452 | A | 7/1998 | Carney |
| 5,790,798 | A | 8/1998 | Beckett, II et al. |
| 5,796,952 | A | 8/1998 | Davis et al. |
| 5,809,247 | A | 9/1998 | Richardson et al. |
| 5,809,250 | A | 9/1998 | Kisor |
| 5,825,869 | A | 10/1998 | Brooks et al. |
| 5,835,572 | A | 11/1998 | Richardson, Jr. et al. |
| 5,862,330 | A | 1/1999 | Anupam et al. |
| 5,864,772 | A | 1/1999 | Alvarado et al. |
| 5,884,032 | A | 3/1999 | Bateman et al. |
| 5,907,680 | A | 5/1999 | Nielsen |
| 5,918,214 | A | 6/1999 | Perkowski |
| 5,923,746 | A | 7/1999 | Baker et al. |
| 5,933,811 | A | 8/1999 | Angles et al. |
| 5,944,791 | A | 8/1999 | Scherpbier |
| 5,948,061 | A | 9/1999 | Merriman et al. |
| 5,958,016 | A | 9/1999 | Chang et al. |
| 5,964,836 | A | 10/1999 | Rowe et al. |
| 5,978,648 | A | 11/1999 | George et al. |
| 5,982,857 | A | 11/1999 | Brady |
| 5,987,466 | A | 11/1999 | Greer et al. |
| 5,990,852 | A | 11/1999 | Szamrej |
| 5,991,373 | A | 11/1999 | Pattison et al. |
| 5,991,796 | A | 11/1999 | Anupam et al. |
| 6,005,932 | A | 12/1999 | Bloom |
| 6,009,429 | A | 12/1999 | Greer et al. |
| 6,014,134 | A | 1/2000 | Bell et al. |
| 6,014,647 | A | 1/2000 | Nizzari et al. |
| 6,018,619 | A | 1/2000 | Allard et al. |
| 6,035,332 | A | 3/2000 | Ingrassia et al. |
| 6,038,544 | A | 3/2000 | Machin et al. |
| 6,039,575 | A | 3/2000 | L'Allier et al. |
| 6,057,841 | A | 5/2000 | Thurlow et al. |
| 6,058,163 | A | 5/2000 | Pattison et al. |
| 6,061,798 | A | 5/2000 | Coley et al. |
| 6,072,860 | A | 6/2000 | Kek et al. |
| 6,076,099 | A | 6/2000 | Chen et al. |
| 6,078,894 | A | 6/2000 | Clawson et al. |
| 6,091,712 | A | 7/2000 | Pope et al. |
| 6,108,711 | A | 8/2000 | Beck et al. |
| 6,122,665 | A | 9/2000 | Bar et al. |
| 6,122,668 | A | 9/2000 | Teng et al. |
| 6,130,668 | A | 10/2000 | Stein |
| 6,138,139 | A | 10/2000 | Beck et al. |
| 6,144,991 | A | 11/2000 | England |
| 6,146,148 | A | 11/2000 | Stuppy |
| 6,151,622 | A | 11/2000 | Fraenkel et al. |
| 6,154,771 | A | 11/2000 | Rangan et al. |
| 6,157,808 | A | 12/2000 | Hollingsworth |
| 6,171,109 | B1 | 1/2001 | Ohsuga |
| 6,182,094 | B1 | 1/2001 | Humpleman et al. |
| 6,195,679 | B1 | 2/2001 | Bauersfeld et al. |
| 6,201,948 | B1 | 3/2001 | Cook et al. |
| 6,211,451 | B1 | 4/2001 | Tohgi et al. |
| 6,225,993 | B1 | 5/2001 | Lindblad et al. |
| 6,230,197 | B1 | 5/2001 | Beck et al. |
| 6,236,977 | B1 | 5/2001 | Verba et al. |
| 6,244,758 | B1 | 6/2001 | Solymar et al. |
| 6,282,548 | B1 | 8/2001 | Burner et al. |
| 6,286,030 | B1 | 9/2001 | Wenig et al. |
| 6,286,046 | B1 | 9/2001 | Bryant |
| 6,288,753 | B1 | 9/2001 | DeNicola et al. |
| 6,289,340 | B1 | 9/2001 | Purnam et al. |
| 6,301,462 | B1 | 10/2001 | Freeman et al. |
| 6,301,573 | B1 | 10/2001 | McIlwaine et al. |
| 6,324,282 | B1 | 11/2001 | McIlwaine et al. |
| 6,347,374 | B1 | 2/2002 | Drake et al. |
| 6,351,467 | B1 | 2/2002 | Dillon |
| 6,353,851 | B1 | 3/2002 | Anupam et al. |
| 6,360,250 | B1 | 3/2002 | Anupam et al. |
| 6,370,574 | B1 | 4/2002 | House et al. |
| 6,404,857 | B1 | 6/2002 | Blair et al. |
| 6,411,989 | B1 | 6/2002 | Anupam et al. |
| 6,418,471 | B1 | 7/2002 | Shelton et al. |
| 6,459,787 | B2 | 10/2002 | McIlwaine et al. |
| 6,487,195 | B1 | 11/2002 | Choung et al. |
| 6,493,758 | B1 | 12/2002 | McLain |
| 6,502,131 | B1 | 12/2002 | Vaid et al. |
| 6,510,220 | B1 | 1/2003 | Beckett, II et al. |
| 6,535,909 | B1 | 3/2003 | Rust |
| 6,542,602 | B1 | 4/2003 | Elazer |
| 6,546,405 | B2 | 4/2003 | Gupta et al. |
| 6,560,328 | B1 | 5/2003 | Bondarenko et al. |
| 6,583,806 | B2 | 6/2003 | Ludwig et al. |
| 6,606,657 | B1 | 8/2003 | Zilberstein et al. |
| 6,665,644 | B1 | 12/2003 | Kanevsky et al. |
| 6,674,447 | B1 | 1/2004 | Chiang et al. |
| 6,683,633 | B2 | 1/2004 | Holtzblatt et al. |
| 6,697,858 | B1 | 2/2004 | Ezerzer et al. |
| 6,724,887 | B1 | 4/2004 | Eilbacher et al. |
| 6,738,456 | B2 | 5/2004 | Wrona et al. |
| 6,757,361 | B2 | 6/2004 | Blair et al. |
| 6,772,396 | B1 | 8/2004 | Cronin et al. |
| 6,775,377 | B2 | 8/2004 | McIlwaine et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,823,384 | B1 | 11/2004 | Wilson et al. |
| 6,870,916 | B2 | 3/2005 | Henrikson et al. |
| 6,901,438 | B1 | 5/2005 | Davis et al. |
| 6,959,078 | B1 | 10/2005 | Eilbacher et al. |
| 6,965,886 | B2 | 11/2005 | Govrin et al. |
| 7,424,715 | B1 | 9/2008 | Dutton |
| 7,430,548 | B2 | 9/2008 | Huelsman et al. |
| 2001/0000962 | A1 | 5/2001 | Rajan |
| 2001/0032335 | A1 | 10/2001 | Jones |
| 2001/0043697 | A1 | 11/2001 | Cox et al. |
| 2001/0056367 | A1* | 12/2001 | Herbert et al. .................. 705/11 |
| 2002/0038363 | A1 | 3/2002 | MacLean |
| 2002/0052948 | A1 | 5/2002 | Baudu et al. |
| 2002/0065911 | A1 | 5/2002 | von Klopp et al. |
| 2002/0065912 | A1 | 5/2002 | Catchpole et al. |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0147522 | A1* | 8/2003 | Elazar ...................... 379/265.06 |
| 2003/0154240 | A1 | 8/2003 | Nygren et al. |
| 2004/0083195 | A1 | 4/2004 | McCord et al. |
| 2004/0088177 | A1* | 5/2004 | Travis et al. ....................... 705/1 |
| 2004/0100507 | A1 | 5/2004 | Hayner et al. |
| 2004/0165717 | A1* | 8/2004 | McIlwaine et al. ...... 379/265.06 |
| 2004/0249650 | A1* | 12/2004 | Freedman et al. ................. 705/1 |
| 2005/0013428 | A1 | 1/2005 | Walters et al. |
| 2005/0138560 | A1 | 6/2005 | Lee et al. |
| 2006/0179064 | A1* | 8/2006 | Paz et al. .......................... 707/10 |
| 2007/0198322 | A1* | 8/2007 | Bourne et al. .................. 705/10 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"Customer Spotlight: Navistar International," Web page, unverified print date of Apr. 1, 2002.

"DKSystems Integrates QM Perception with OnTrack for Training," Web page, unverified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," *Communications ACM* 45(5): 62-63 (May 2002).

Benyon and Murray, "Adaptive Systems: from intelligent tutoring to autonomous agents," pp. 152, Web page, unknown date May 29, 2007.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking,"*ACM,* unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (©2001).

Cybulski and Linden, "Teaching Systems Analysis and Design Using Multimedia and Patterns," unknown date, unknown source, May 29, 2007.

De Bra et al., "Adaptive Hypermedia: From Systems to Framework,"*ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report,"*Educational Technical* pp. 7-16 (Mar. 1992).

Diessel et al., "Individualized Course Generation: A Marriage Between CAL and ICAL,"*Computers Educational* 22(1/2) 57-65 (1994).

Dyreson, "An Experiment in Class Management Using the World Wide Web," pp. 1-12, Web page, unverified print date of Apr. 12, 2002.

E Learning Community, "Excellence in Practice Award: Electronic Learning Technologies,"*Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning* THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers,"*Emedia Professional* 10(8):6678 (Aug. 1997).

Fritz, "ToolBook II: Asymetrix's updated authoring software tackles the Web,"*Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support,"*Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring,"*Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence,* Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of End-User Training Needs," *Communications ACM* 38(7):27-39 (Jul. 1995).

O'Herron, "CenterForce Technologies CenterForce Analyzer," Web page unverified print dateof Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool,"*Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: Univerity of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom,"*InfoWorld* 20(47):6467 (Nov. 23, 1998).
Unknown Author, "Long-distance learning," *Info World* 20(36):7676 (1998).
Untitled, 10$^{th}$ Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business", May 29, 2007.
Witness Systems promotional brochure for eQuality entitled "Building Customer Loyalty Through BusinessDriven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst, *It's Baa-aack. How Interative TV is Sneaking Into Your Living Room*, The AnchorDesk, May 10, 1999.
Berst, *Why Interactive TV Won't Turn You On (Yet)*, The AnchorDesk, Jul. 13, 1999.
Borland and Davis, *US West Plans Web Services on TV*, CNETNews.com, Nov. 22, 1999.
Brown, *Let PC Technology Be Your TV Guide*, PC Magazine, Jun. 7, 1999.
Brown, *Interactive TV: The Sequel*, NewMedia, Feb. 10, 1998.
Cline, Déjàvu—*Will Interactive TV Make It This Time Around?*, DevHead, Jul. 9, 1999.
Crouch, TV Channels on the Web, PC World, Sep. 15, 1999.
D'Amico, *Interactive TV Gets $99 set-top box*, IDG.net, Oct. 6, 1999.
Davis, *Satellite Systems Gear Up for Interactive TV Fight*, CNETNews.com, Sep. 30, 1999.
Diederich, *Web TV Data Gathering Raises Privacy Concerns*, ComputerWorld, Oct. 13, 1998.
*Digital Broadcasting*, Interactive TV News, May 29, 2007.
*EchoStar, MediaX Mix Interactive Multimedia With Interactive Television*, PRNews Wire, Jan. 11, 1999.
Furger, *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News, May 29, 2007.
*Interactive TV Wars Heat Up*, Industry Standard, May 29, 2007.
Needle, *Will the Net Kill Network TV?* PC World Online, Mar. 10, 1999.
Kane, *AOL-Tivo: You've Got Interactive TV*, ZDNN, Aug. 17, 1999.
Kay, *E-Mail in Your Kitchen*, PC World Online, 093/28/96.
Kenny, *TV Meets Internet*, PC World Online, Mar. 28, 1996.
Linderholm, *Avatar Debuts Home Theater PC*, PC World Online, Dec. 1, 1999.
Mendoza, *Order Pizza WhileYou Watch*, ABCNews.com, May 29, 2007.
Moody, *WebTV: What the Big Deal?*, ABCNews.com, May 29, 2007.
Murdorf, et al., *Interactive Television—Is There Life After the Internet?*, Interactive TV News, May 29, 2007.
Needle, *PC, TV or Both?*, PC World Online, May 29, 2007.
Interview with Steve Perlman, CEO of Web-TV Networks, PV World Online, May 29, 2007.
Press, *Two Cultures, The Internet and Interactive TV*, Universite de Montreal, May 29, 2007.
Reuters, *Will TV Take Over Your PC?*, PC World Online, May 29, 2007.
Rohde, *Gates Touts Interactive TV*, InfoWorld, Oct. 14, 1999.
Ross, *Broadcasters Use TV Signals to Send Data*, PC World Oct. 1996.
Schlisserman, *Is Web TV a Lethal Weapon?*, PC World Online, May 29, 2007.
Stewart, *Interactive Television at Home: Television Meets the Internet*, Aug. 1998.
Swedlow, *Computer TV Shows: Ready for Prime Time?*, PC World Online, May 29, 2007.
Wilson, *U.S. West Revisits Interactive TV*, Interactive Week, Nov. 28, 1999.

* cited by examiner

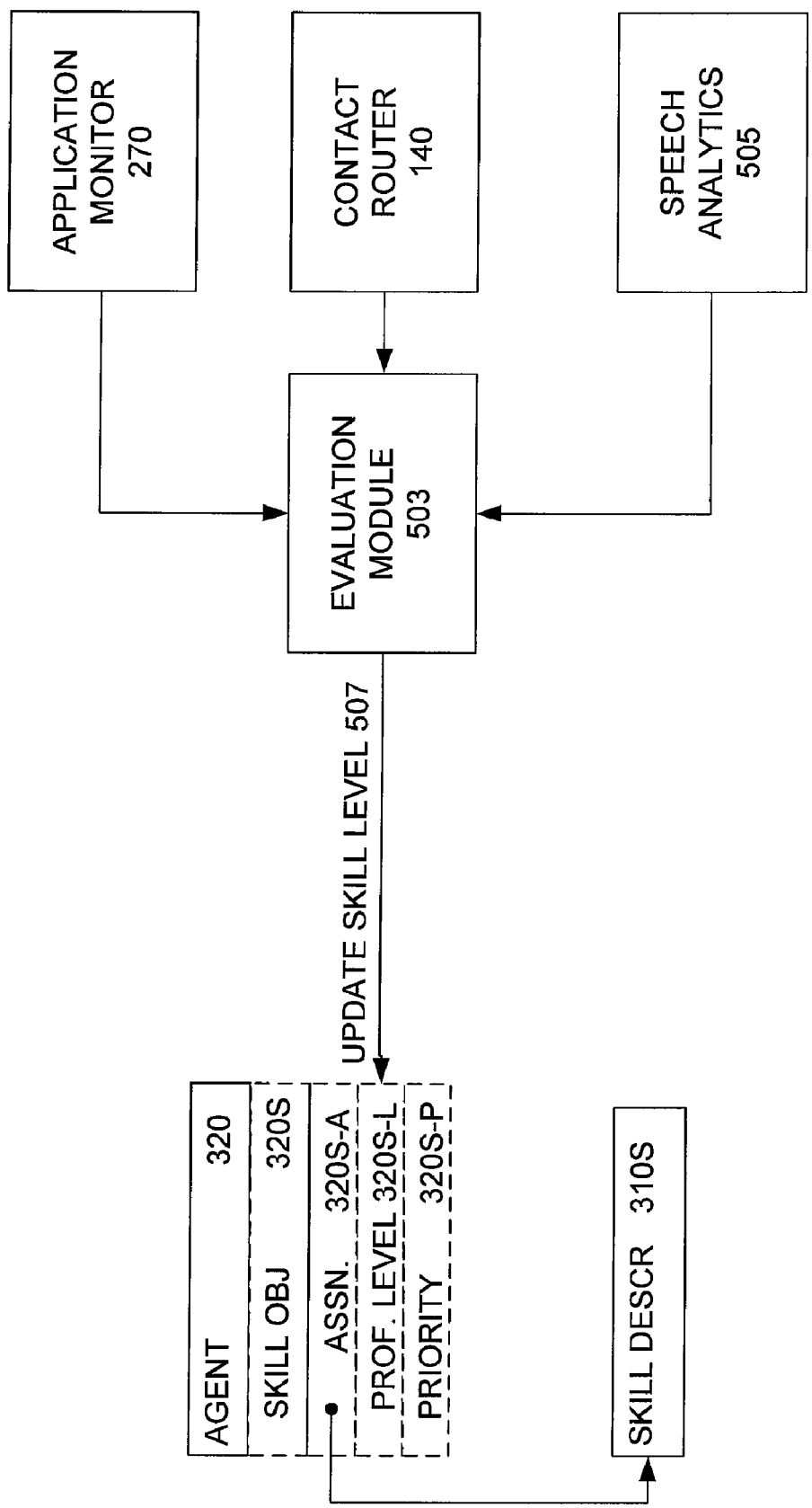

SYSTEM AND METHOD FOR INTEGRATED WORKFORCE AND QUALITY MANAGEMENT

CROSS REFERENCE TO RELATED APPLICATIONS

This application claims the benefit of U.S. Provisional Application No. 60/796,418, filed May 1, 2006 and hereby incorporated by reference herein.

FIELD OF THE DISCLOSURE

The present disclosure relates to contact centers.

BACKGROUND

The business of a call center, also known as a contact center, is to provide rapid and efficient interaction between agents and customers (or prospective customers). Existing solutions require the purchase of multiple hardware and software components, typically from different vendors, to achieve the business goals of the contact center. The use of separate systems of components leads to a variety of problems. For instance, each system typically has its own method of configuration and its own user interface. Thus, exchanging data between the systems requires additional work by someone at the contact center.

Furthermore, contact centers are continually tasked with striking a balance between service quality, efficiency, effectiveness, revenue generation, cost cutting, and profitability. As a result, today's contact center agents are charged with mastering multiple data sources and systems, delivering consistent service across customer touch points, up-selling, cross-selling, and saving at-risk customers, while winning new ones.

The systems and methods described herein provide integrated solutions for performing workforce management and quality monitoring. Combining these two functionalities as a unified integrated solution, delivered through a single platform, enables users to gain more insight and make smarter decisions faster about sales, service, and overall operations. This takes contact center tools beyond the traditional "suite" approach to a true single workforce optimization platform.

As can be seen, while each technology segment delivers value, integration is the key: together the segments deliver greater impact than the sum of their individual parts. Utilizing them separately limits the contact center's potential to become a strategic business asset.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 5A is an object diagram showing component interactions in one embodiment of a method or system of integrating contact evaluations and agent skills.

SUMMARY OF THE INVENTION

In this regard, systems and methods for integrating quality monitoring and workforce management are provided. An exemplary embodiment of such a method comprises: capturing a plurality of contacts made by an agent and receiving an evaluation of the contacts. The evaluation comprises a measurement of the agent skill. The method further comprises updating skill information associated with an agent based on the evaluation. Another exemplary embodiment of such a method comprises receiving information about a skill, where the skill is associated with an agent. The method further comprises capturing a plurality of contacts made by an agent and receiving an evaluation form for the contacts. The form produces a measurement of the agent skill. The method further comprises updating the form based on the skill information. Another exemplary method comprises capturing a plurality of contacts, where each contact is made by a one of a plurality of agents. The method further comprises receiving a plurality of scores, where each score evaluating one of the contacts. The method further comprises collecting the plurality of scores associated with a selected one of the agents to produce an agent scorecard, and incorporating at least a portion of the scores within the agent scorecard as attributes of the selected agent within the workforce manager. Another exemplary method comprises capturing a plurality of contacts, where each contact is distributed to one of a plurality of queues and handled by one of a plurality of agents. The method further comprises receiving a first score, evaluating quality of one of the contacts distributed to a selected one of the queues, and receiving a second score, evaluating quality of another one of the contacts distributed to the selected queue. The method further comprises aggregating, in the workforce manager, the first and the second score to produce a statistic representing quality of contacts for the selected queue.

Other systems, methods, features, and/or advantages of this disclosure will be or may become apparent to one with skill in the art upon examination of the following drawings and detailed description. It is intended that all such additional systems, methods, features and/or advantages be included within this description and be within the scope of the present disclosure.

DETAILED DESCRIPTION

Figure 1:
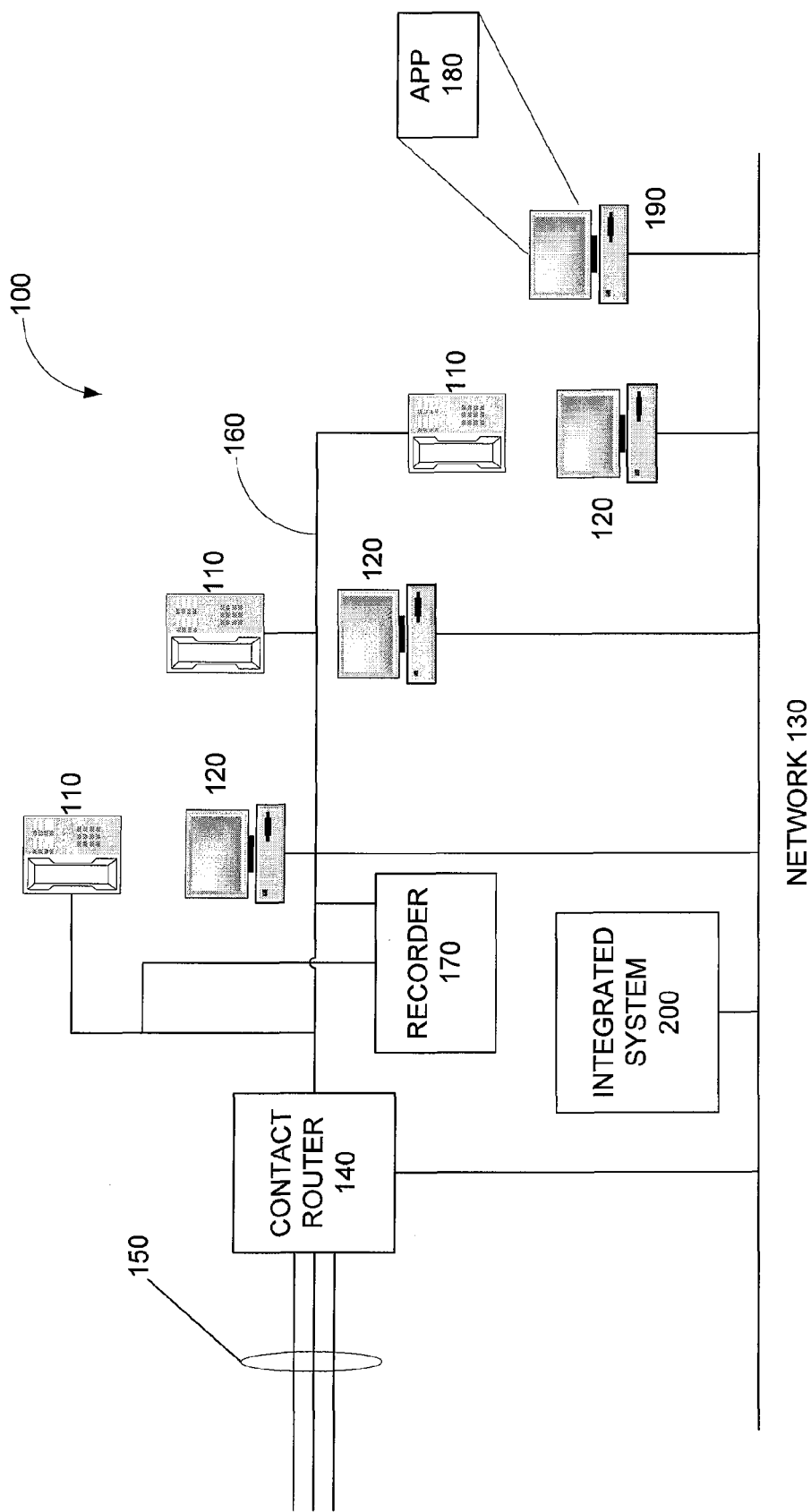
FIG. 1 is a block diagram of a contact center environment.

FIG. 1 is a block diagram of a contact center environment 100. The contact center 100 is staffed by agents who handle incoming and/or outgoing contacts. Although the traditional and most common form of contact is by phone, other types of contacts are becoming more common (e.g., text chat, web collaboration, email, and fax). An agent workspace includes an agent phone 110 and a workstation computer 120. A network 130 connects one or more of the workstations 120.

A contact router 140 distributes incoming contacts to available agents. When the contacts are made by traditional phone lines, the contact router 140 operates by connecting outside trunk lines 150 to agent trunk lines 160. In this environment, the contact router 140 may be implemented by an automatic call distributor (ACD), which queues calls until a suitable agent is available. Other types of contacts, such as Voice over Internet Protocol (VoIP) calls and computer-based contacts (e.g., chat, email) are routed over one or more data networks. These contacts are distributed over network 130 to one of the agent workstations 120.

A call recorder 170, connected to one or more of the agent trunk lines 140, provides call-recording capabilities. In a typical call center such as that shown in FIG. 1, the recorder 170 is a server with specialized hardware (e.g., digital signal processing boards).

During a customer contact, the agent interacts with one or more applications 180 running on the workstation 120. Example workstation applications 180 are those that give the agent access to customer records, product information, ordering status, and transaction history, for example. The applications 180 may access one or more enterprise databases (not shown) via network 130.

The contact center 100 also includes a computer-implemented integrated contact center system 200, described in further detail in connection with FIG. 2.

Figure 2:
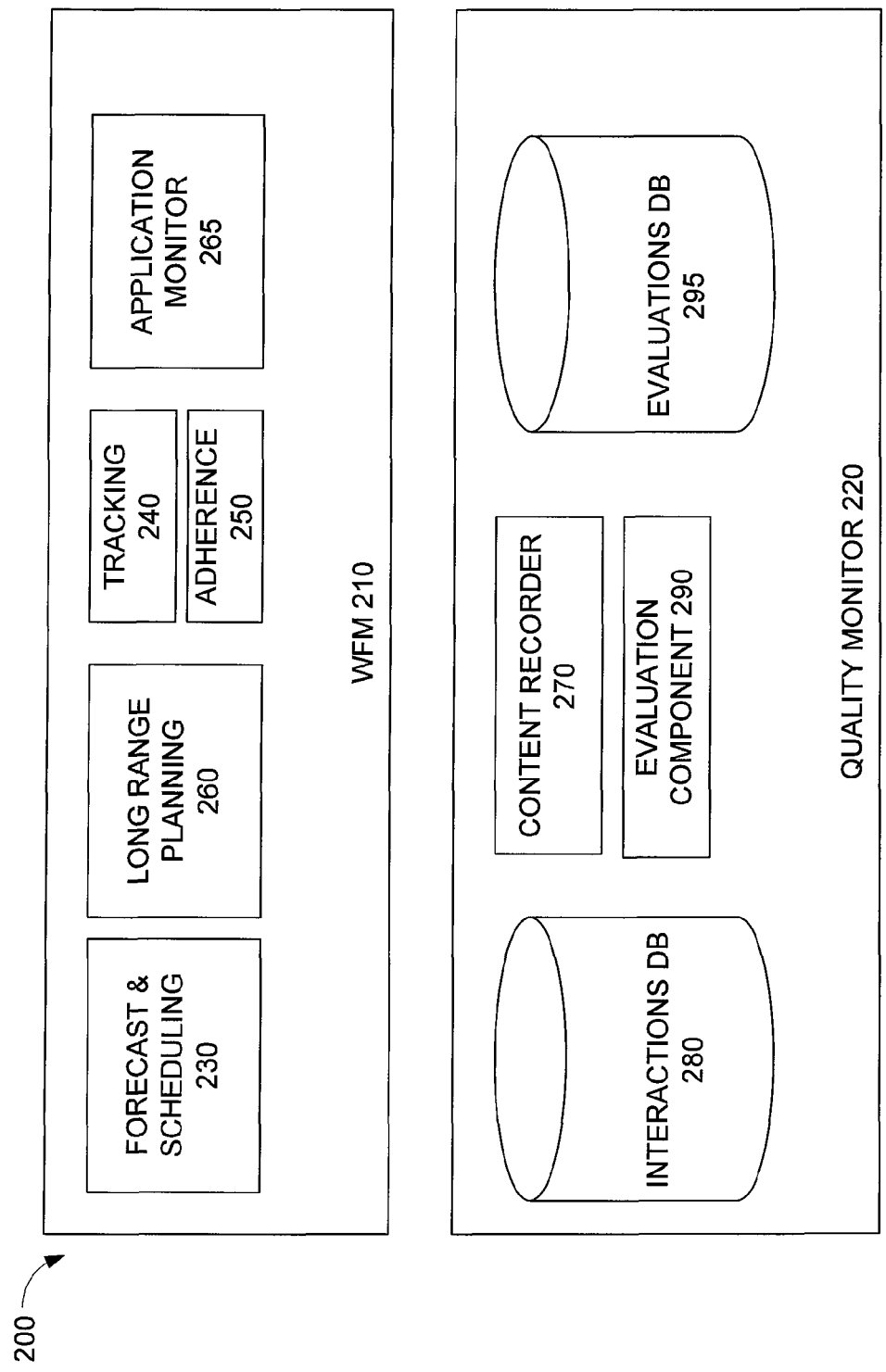
FIG. 2 is a high-level view of components in one embodiment of an integrated contact center system.

FIG. 2 is a high-level view of components in one embodiment of an integrated contact center system 200. The integrated system 200 includes at least a work force manager (WFM) component 210 and a quality monitoring (QM) component 220. An integrated contact center system such as system 200 allows contact center analysts to quickly access the right information. Such an integrated system allows valuable and previously undiscovered information to be uncovered. This new level of visibility into contact center operations should allow personnel to make better decisions faster.

The WFM component 210 performs many functions related to the agent workforce. The functionality of the entire WFM component 210 is typically divided among several applications, executables, processes, or services. A forecast and scheduling component (230) calculates staffing levels and agent schedules based on historical interaction (contact) patterns. A tracking component (240) provides a contact center supervisor or manager with information about agent activities and agent-customer interactions, both historical and real-time. An adherence component (250) supplies the supervisor with information on how well each agent complies with call center policies. A long range planning component (260) uses discrete, event-based simulation to allow a contact center manager to do strategic planning, taking into account future events such as hiring, attrition, and agent training.

As the agent takes calls throughout a workday, contact router or ACD 140 reports changes in the state of the agent's phone as telephone events. As an agent interacts with various workstation applications 180, an application monitor 265 tracks and reports application events. In one implementation, the granularity of application events is at the application level, so that events describe when applications start and exit, and when a user switches from one application to another. In another implementation, the granularity of application events is screen-level, so that events describe a particular screen displayed within an application. In yet another implementation, application events are low-level, including input and/or output associated with each application (e.g., keystrokes, mouse clicks, and screen updates).

The quality monitor (QM) 220 captures multimedia customer interactions, which can provide valuable information about what goes on in the contact center. QM 220 also provides tools which contact center personnel can use to analyze the valuable information contained in the captured customer interaction, so that these personnel can translate these captured interactions into increased professional development and improved customer service.

The QM 220 includes a content recorder (270) for recording agent-customer interactions. The QM 220 stores the interactions in an interactions database 280, which may include descriptive information as well as recorded content. Contact center personnel, such as supervisors and quality analysts, play back some of the interactions and use an evaluation component (290) to review, evaluate, and score agent performance in various categories (product knowledge, selling, listening, etc.)

Content recorder 270 can be configured to capture all interactions, or a selected set of interactions based on user-defined business rules which define when a customer interaction becomes a contact. Using business rules, only those transactions of interest to the organization are captured. The business rules can trigger recording, initiate enterprise collaboration by notifying individuals or groups of the captured contacts and emerging trends, and allow users to assign attributes or "tags" to the contacts for quick identification.

The Content recorder 270 can capture voice and data interactions from both traditional and IP telephony environments and can handle high-volume recording for compliance and sales verification. The Content recorder 270 can also record all voice transactions across multiple sites, or randomly capture a subset of transactions that may be of particular interest, as well as record contacts on-demand.

Recorded contacts are then evaluated against an evaluation form. The forms and the results, for a particular call or for a particular agent across multiple calls, are stored in an evaluations database 295. Scores in the Evaluations database may be extracted, transformed, and loaded into an enterprise reporting data warehouse, where analytical and trend statistics are generated. The score data can be further rolled up into a scorecard for the agent.

It should be noted that embodiments of one or more of the systems described herein could be used to perform an aspect of speech analytics (i.e., the analysis of recorded speech or real-time speech), which can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

In this regard, various types of recording components can be used to facilitate speech analytics. Specifically, such recording components can perform one or more of various functions such as receiving, capturing, intercepting, and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence, and compliance purposes, for example. Such integrated functionality can improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities.

Referring back to the collections example outlined above, by using emotion and concept detection, companies can identify which customers are attempting to mislead collectors into believing that they are going to pay. The earlier the company is aware of a problem account, the more recourse options they may have. Thus, the speech analytics of the present disclosure can function as an early warning system to reduce losses.

Also included in this disclosure are embodiments of integrated workforce optimization platforms, as discussed in U.S. patent application Ser. No. 11/359,356, filed on Feb. 22, 2006, entitled "Systems and Methods for Workforce Optimization," and U.S. patent application Ser. No. 11/540,185, filed on Sep. 29, 2006, entitled "Systems and Methods for facilitating Contact Center Coaching," both of which are hereby incorporated by reference in their entireties. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (Kips) and scorecards that analyze and help identify synergies, opportunities and improvement areas; (4) e-Learning—training, new information and protocol disseminated to staff, leveraging best practice customer interactions and delivering learning to support development; (5) Analytics—deliver insights from customer interactions to drive business performance; and/or (6) Coaching—feedback to promote efficient performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

Figure 3:
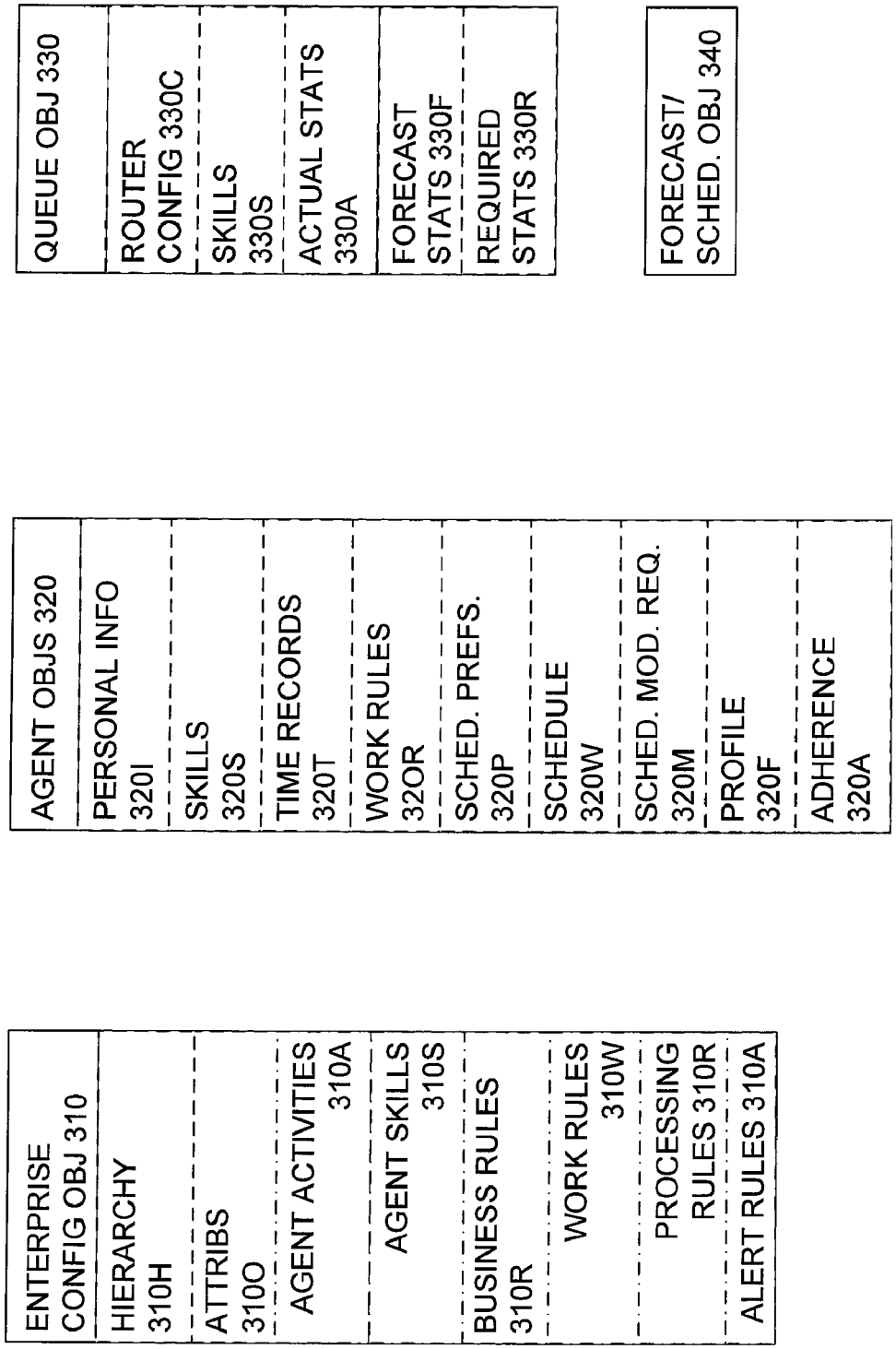
FIG. 3 shows the data objects maintained by the WFM component from FIG. 2.
Figure 4:
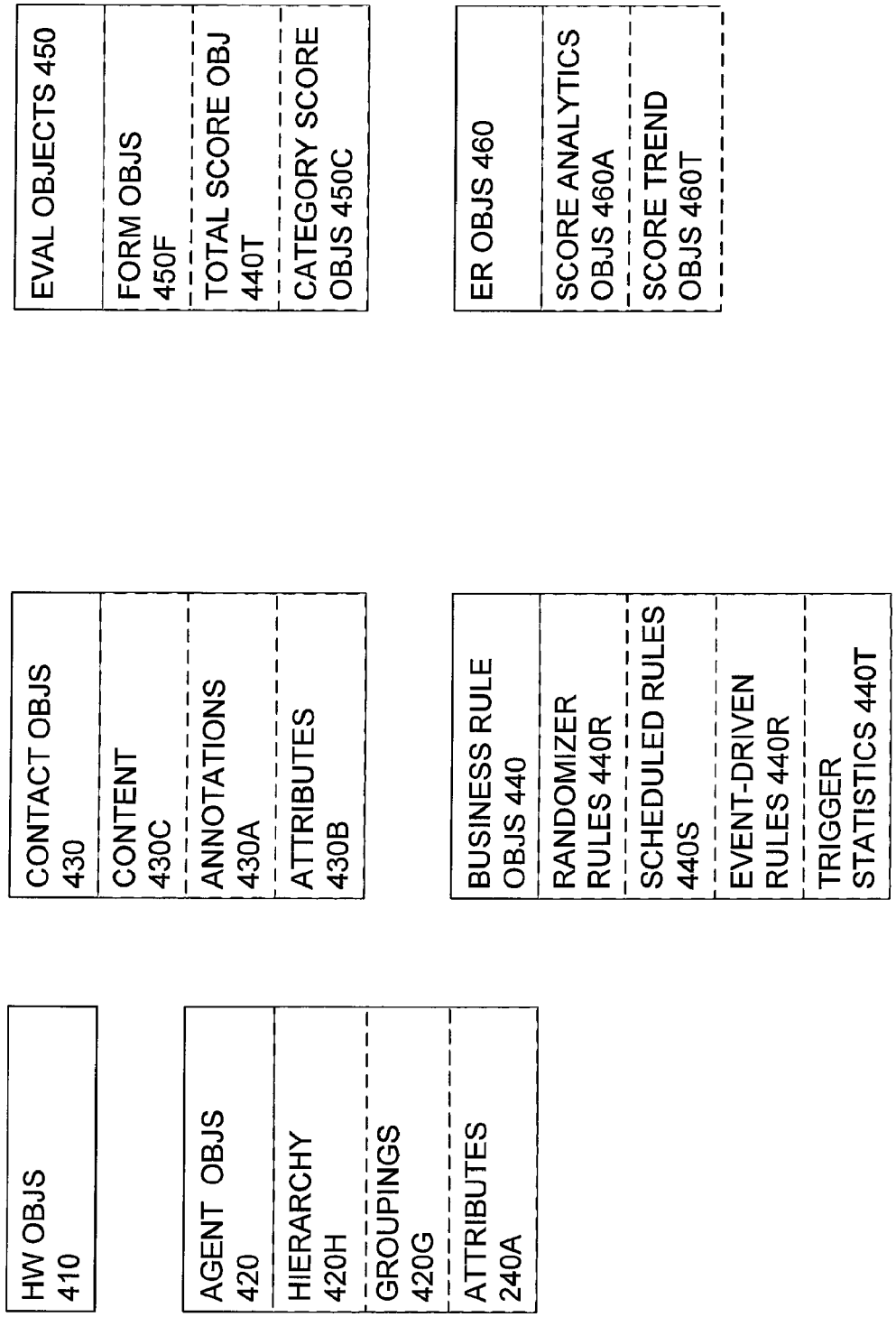
FIG. 4 shows data objects maintained by the QM component of FIG. 2.

FIG. 2 presented a functional view of integrated contact center system 200, dividing the system 200 into components offering various functionalities. FIGS. 3 and 4 show a data-centric view of integrated contact center system 200. Instead of focusing on how functionality is distributed among components, FIGS. 3 and 4 focus on how data is organized by the main components of the system 200. Although the data organization herein is described in terms of objects, an object-oriented system is not required.

FIG. 3 shows the data objects maintained by WFM component 210, and the organization of these objects into groups: enterprise configuration objects (310), which relate to the organization of the contact center as a business enterprise; agent objects (320), which relate to agents in the contact center; queue objects (330), which relate to the queues to which contacts are assigned and from which agents handle contacts; and forecast/scheduling objects (340), which relate to schedules of agents who are staffed to handle expected contacts.

Objects within the enterprise configuration group 310 can be further grouped into organization hierarchy (310H), organization attributes (310O), and organization business rules (310R). Organization attributes 310O include data such as contact center hours of operation, agent activities (310A) and agent skills (310S).

Agent activities 310A include any activity to which an agent on a shift can be assigned, for example: work activities such as phone and research; planned events such as training or staff meetings; shift activities such as lunch or break; and absence activities such as vacation or jury duty. Agent skills 310S include any work-related skill which an agent might have, e.g. competency in sales/tech support/billing, knowledge of particular product, foreign language, competency with media type (incoming calls/email/callbacks).

Organization business rules 310R include work rule objects (310W), alert rule objects (310X), and processing rule objects (310P)). Work rule objects 310W include shifts, shift activities, work patterns, and assignment rules. The work rule objects 310W allow the WFM scheduler function to produce schedules that reflect the needs of both the contact center and individual agents. Alert rules 310X specify events that generate alerts to specific users or targets when unusual events occur, such as an agent going out of adherence, a key performance indicator going out of range, or an employee schedule changes. Processing rule objects 310P describe how Schedule Modification Request objects (320M, described below) are approved or denied. Rule can be created to automatically approve the agent requests, automatically deny the requests, or flag the requests for manual approval. Two examples of Processing rules are: Time Off requests will be automatically denied if they are less then 2 weeks prior to the requested date; Shift Swaps will be automatically approved if the 2 agents have identical skills.

Objects within the agent group 320 pertain to a specific agent, rather than the organization as a whole. The objects in the agent group 320 can be further grouped into personal data (320I), skills (320S), time records (320T), work rules (320R), scheduling preferences (320P), schedules (320W), schedule modification requests (320M), profiles (320F), and adherence information (320A).

Personal data 320I includes information such as name, address, wage, employee/contractor status, full-time/part-time, etc. Skills 320S is a list of zero or more work-related skills, chosen from the superset of skills defined for the organization (310S). Skills 320S may also contain, for each skill, a competency level (e.g., 1 to 5 with 5 being best) and a priority. Skill priority affects contact routing. For example, suppose the only agent available has Spanish and technical support skills, and contacts are waiting in both the Spanish queue and technical support queue. In that case, if Spanish is a high priority skill, then contact from the Spanish queue will be routed to that agent, before the contact in the technical support queue.

Time records 320T reflect actual work activities performed by an agent during a time period. Schedules 320W describe the assignment of work activities (from the set 310A defined for the organization) to an agent for a specific time period. Work rules 320R affect how an agent is scheduled, for example, which days of the week, minimum and maximum consecutive days of work, etc. Work rules for an agent 320R are chosen from the superset of work rules defined for the organization (310W). Scheduling preferences 320P also affect scheduling, by describing preferences an agent has for shift length, start time, and days off. Schedule modification request objects 320M allow an agent to make requests such as time off, a shift swap with another agent, or bidding against other agents for a shift.

Agent profiles 320F are used by the WFM long-range planning component 260. Agent profiles 320F describe hiring plans, attrition rates, and training plans. The planning component 260 creates potential agents using these profiles 320F, and then runs simulations to determine the effect of hiring, attrition, and training on contact center schedule and performance.

Adherence object 320F contains data related to whether the agent's work activities adhere to the call center policies. Activities that do not comply are "out of adherence." The adherence object 320F describes what activities are in/out of adherence, and may include information about the agent phone and workstation state during the out-of-adherence period.

As described earlier in connection with FIG. 1, contact router 140 assigns each contact to a queue. Objects within the queue group are queue-specific. Objects within the queue group 330 can be further grouped into configuration of the contact router (330C), skills (330S), actual statistics (330A), forecasted statistics (330F), and required statistics (330R). The contact router configuration 330C includes configuration options such as which queues exist on the contact router, what time zone the contact router is located in, and what type of media the contact router handles. The set of skills required for a contact to be classified and assigned to a particular queue is maintained in the skills object 330S.

Associated with each queue are various statistics, describing the minimum required behavior of a queue, the actual behavior of a queue, and the forecast behavior of a queue. These statistics are maintained, respectively, in the required statistics (330R), actual statistics (330A), and forecasted statistics (330F) objects. Typical statistics for the actual and forecasted categories include contact volume, average handle time, service level (usually expressed as "X % of calls answered within Y minutes"), average speed to answer, and abandons. Typical statistics for the required category include average speed to answer, service level, and staff count (body and/or full-time-equivalent).

Objects within the forecast and scheduling group 340 produce workload forecasts from historical contact information, create and evaluate possible agent schedules, and simulate agent schedules to predict service levels.

FIG. 4 shows data objects maintained by QM 220, and the organization of these objects into groups: hardware objects (410); agent objects (420); contact objects (430); business rule engine objects (440); evaluation objects (450); and enterprise reporting objects (460).

Hardware objects 410 relate to the configuration of various hardware components used in the contact center, such as telephony switches, agent telephones, and agent workstations. Objects within the agent group 420 describe agents, such as the agent-supervisor hierarchy 420H, agent groupings 420G, and agent-specific attributes 420A such as logon-identifier.

Contact objects 430 describe the recorded interactions between agents and customers. Objects in the contact group (430) can be further grouped into content (430C), annotations (430A), and attributes (430B). Content 430C may include audio, video, and/or workstation data. Annotations (430A) may include text, graphic, or audio. Attributes 430B may be derived from hardware objects 410 (e.g., the recording hardware) or from application-level data such as that provided by a customer relationship management (CRM) system, a performance management system, or other contact center software.

Business rule objects 440 describe the rules which drive the capture of interactions by the QM 220. Business rule objects 440 can be further grouped into randomizer rules (440R), scheduled rules (440S), and event-driven rules (440E), and trigger statistics (440T). Randomizer rules 440R record a randomized sample of contacts from a group of agents. Scheduled rules 440S record contacts during specific days and times. Event-driven rules 440E record contacts based on contact attributes (e.g., call made to a particular phone number, or email with particular word in subject line). The trigger statistics object 440T maintains statistics about which rules are triggered and when.

A recorded contact is played back and the content is analyzed by a human, by analytics software, or a combination of both. Evaluation objects 450 describe the evaluation of recorded contacts. Evaluation objects may pertain to a particular contact (implying a particular agent), or may pertain to a set of contacts for a particular agent. The evaluation produces one or more scores for the contact. A score may be specific to an agent skill (450S), or may be an overall score (450T) for the contact as a whole. A form object 450F describes the form used to perform the evaluation. Forms typically include questions divided into categories, with a numeric score for each question. In one embodiment, each category relates to a particular agent skill.

Enterprise Reporting objects 460 make use of evaluation objects 450. Score Analytics objects 460A include rollups of scores, per-agent, per-group, etc. The rollups can include averages, minimums, and maximums. Score Trend objects 460T track trends of the score objects over time.

Now that WFM and QM data objects have been described, an exemplary list of interactions between these objects will be described. These interactions allow novel features to be implemented in the integrated contact center software. One such interaction between WFM objects and QM objects is an import/export feature which allows WFM objects to import data from QM objects, and vice-versa.

FIG. 5A is an object diagram showing component interactions in one embodiment of a method or system of integrating contact evaluations and agent skills. WFM component 210 includes a skill description 310S of a work-related agent skill. A skill description 310S can apply to any agent in the organization, and in one embodiment is part of the enterprise configuration group of objects (310). (See FIG. 3.) Examples of skill descriptions are: competency in a business area such as sales or product support; competency in a business application such as a billing system or a customer relationship manager (CRM); knowledge of particular product; competency in a foreign language; and competency with a media type such as incoming calls, email, or callbacks. Skill description 310S is associated with an agent 320 (or agents). The association with skill description 310S is stored as skill information 320S within agent object 320. (See FIG. 3.) Skill information 320S for each skill also contains a competency level 320S-L and, optionally, a priority 320S-P. Thus, skill information 320S describes a particular skill possessed by a particular agent. Typically, a contact center supervisor interacts with a user interface provided by WFM component 210 to input skill descriptions 310S and their association with agents 320.

Evaluation module 503 receives input from application monitor 265, contact router or ACD 140, and speech analytics module 505. Application monitor 265, discussed above, analyzes application-level events from workstation applications 180 (FIG. 1) and provides evaluation module 503 with application usage patterns. Contact router 140 provides evaluation module 503 with telephone events (e.g., hold time, handle time, number of transfers, etc.). Speech analytics 505 provides evaluation module 503 with call attributes. Examples of speech analysis include categorizing calls based on content, and analyzing a call against an expected call pattern and reporting exceptions to the pattern.

Evaluation module 503 uses these inputs, or combinations of these inputs, to determine an agent's skill level, and then updates (507) skill competency level 320S-L in the agent object 320 to reflect the result. One example of using application usage patterns to drive the evaluation sets competency level 320S-L based on whether an agent uses a particular application too frequently, or for too long. Another example of using application usage patterns to drive the evaluation sets competency level 320S-L based on whether an agent uses a particular sequence of applications as expected. Examples of using telephony events to drive the evaluation include setting competency level 320S-L based on a number of holds, a number of transfers, and a hold time. Examples of using speech analytics to drive the evaluation include setting competency level 320S-L based on the ratio of agent talk time to listen time, and based on the level of emotion detected in a call.

Figure 5B:
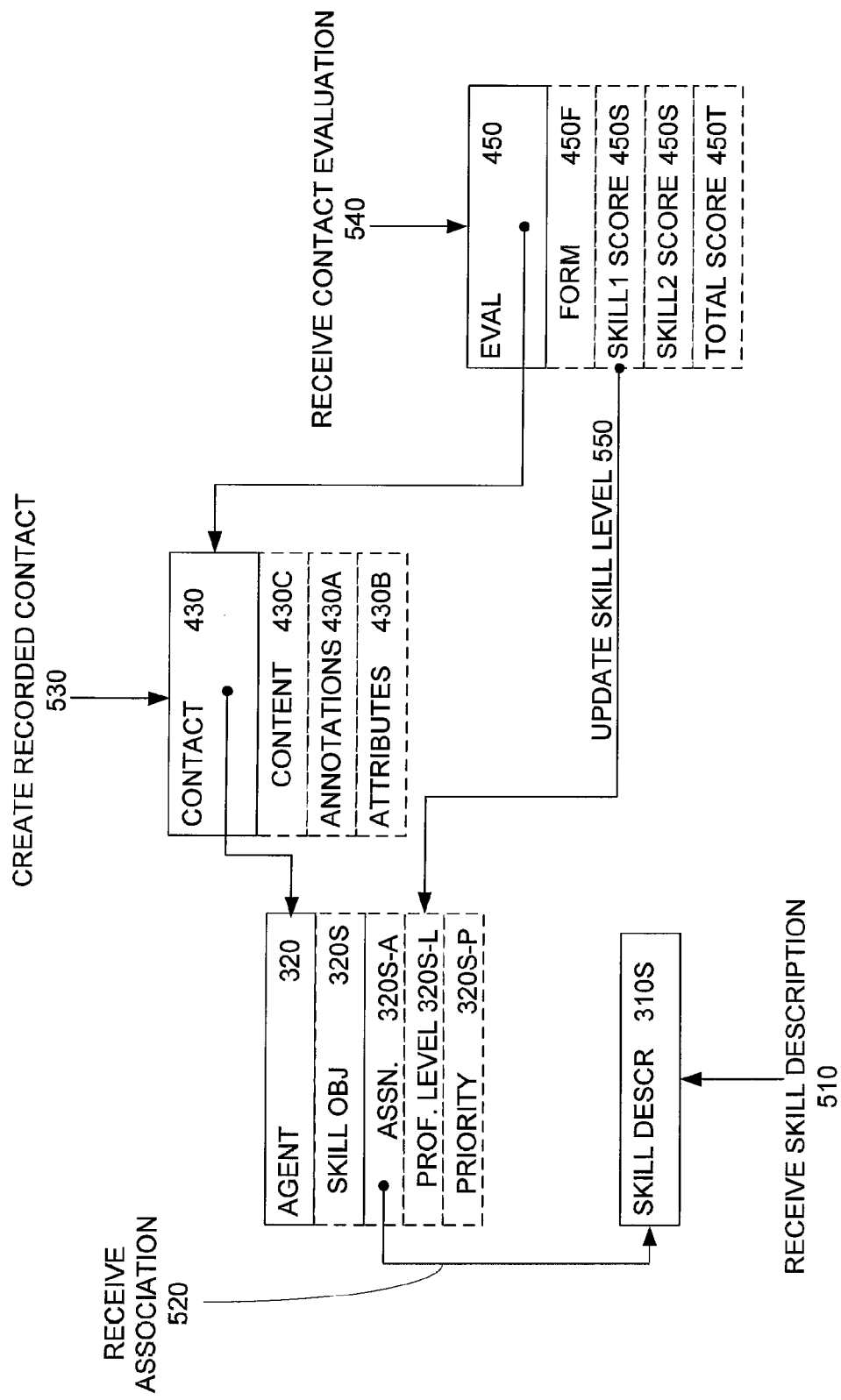
FIG. 5B is an object diagram showing component interactions in another embodiment of a method or system of integrating contact evaluations and agent skills.

FIG. 5B is an object diagram showing component interactions in another embodiment of a method or system of integrating contact evaluations and agent skills. The sequence begins with step 510, where WFM component 210 receives a skill description 310S of a work-related agent skill. At step 520, WFM component 210 receives an association between an agent 320 and skill description 310S. The association with skill description 310S is stored as skill information 320S within the agent object 320. (See FIG. 3.) The skill information 320S for each skill also contains a competency level 320S-L and, optionally, a priority 320S-P.

At step 530, quality monitor 220 captures at least one agent-customer interaction (430), also known as a contact. A recorded contact 430 is evaluated, by a person or by an analytics component. The evaluation 450 is then received by quality monitor 220 at step 540. Evaluation 450 is specific to an agent 320, and includes a measure of one or more skills (450S) possessed by that agent 320, as rated by an evaluation of a recorded contact 430, or a group of recorded contacts 430, involving that agent 320.

At step 550, the skill competency level 320S-L in the agent object 320 is updated to reflect the skill measurement 450S in the evaluation object 450. That is, the WFM component 210 obtains the agent's competency from evaluation data produced and managed by quality monitor 220. An additional mapping or translation step (not shown) may be performed if the two objects use different scales. In some embodiments, the skill measurement 450S in the evaluation object 450 is also used to remove a particular skill 320S from an agent object 320, for example, if the evaluation shows that the agency is no longer competent in a particular area.

In some embodiments, a recorded contact 430 is played back and a determination is made as to which agent skills are appropriate in processing the call. Quality monitor 220 adds tags or annotations to the recording to indicate appropriate skills, and these tags are used to populate evaluation 450 with specific questions and scoring criteria relevant to that particular skill. For example, In the case of a recorded contact 430 of a Spanish-speaking caller, quality monitor 220 tags the recording with "Spanish", and evaluation 450 uses this tag to display sections and/or questions that evaluate an agent's proficiency in Spanish. In some embodiments, once a recorded contact 430 is tagged with a skill, quality monitor 220 automatically determines an agent's proficiency on recorded calls, or a subset of recorded calls, that utilize that skill (where proficiency measures an agent's handle time for a call, relative to an average handle time).

In some embodiments, the sections and questions associated with the skill are combined (e.g., averaged) to produce a skill measurement 450S (e.g., quality score) for a particular skill. WFM component 210 utilizes the skill measurement 450S to select agents to ensure that a quality goal is met for a specific queue associated with the skill.

Figure 6:
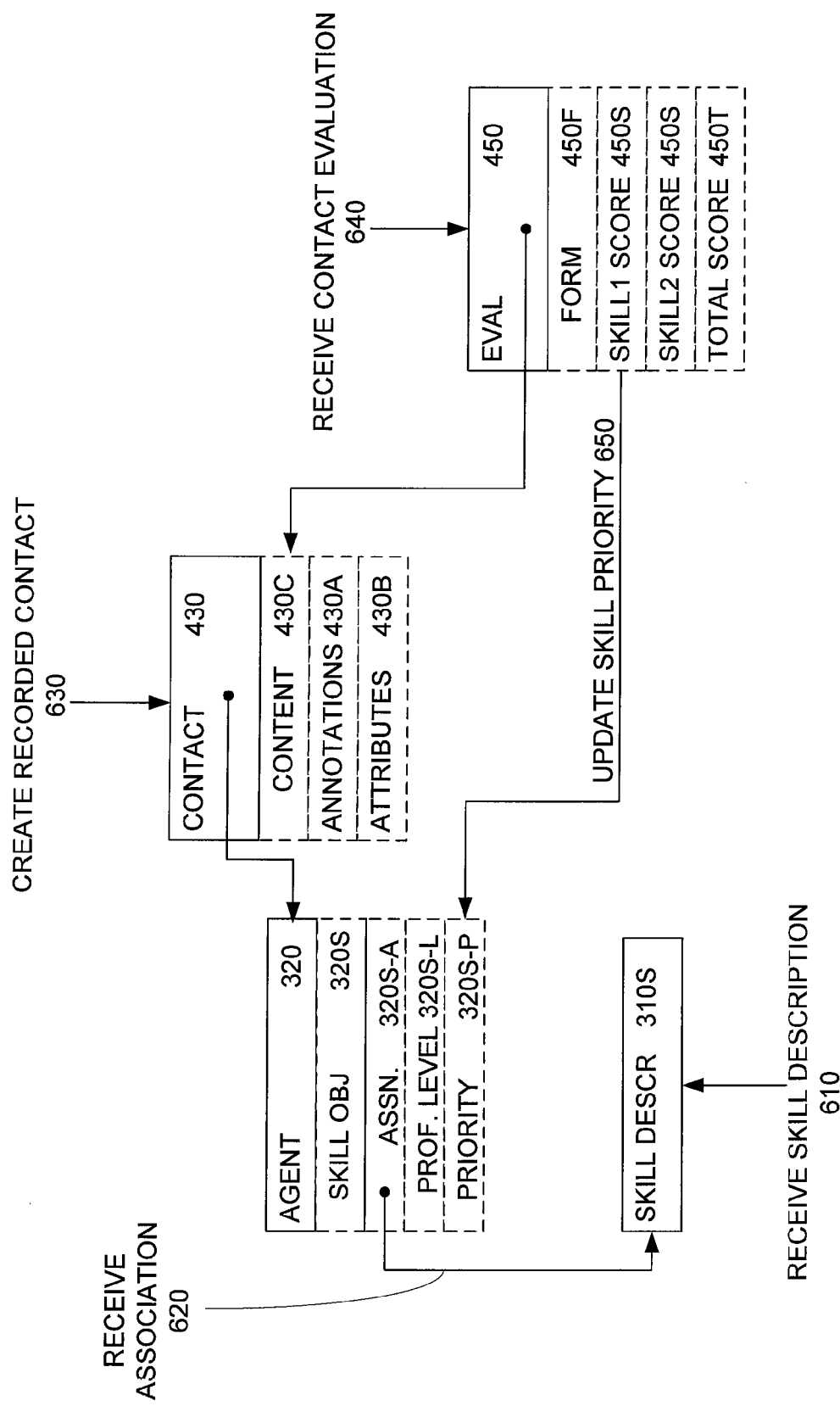
FIG. 6 is an object diagram showing component interactions in another embodiment of a method or system of integrating contact evaluations and agent skills.

FIG. 6 is an object diagram showing component interactions in another embodiment of a method or system of integrating contact evaluations and agent skills. WFM component 210 receives skill description 310S at step 610 and an association between an agent 320 and skill description 310S at step 620. QM 220 captures a recorded contact 430 involving agent 320 at step 630, and receives an evaluation 450 of contact 430 at step 640.

As described earlier, skill information for an agent is stored as skill information 320S within the agent object 320. (See FIG. 3.) The skill information 320S contains a priority 320S-P. Skill priority 320S-P is used in routing calls. If two or more agents are available to handle a contact involving a particular skill, the contact is routed to the agent that has the highest priority 320S-P for that skill. If only one agent with appropriate skills is available, and that agent has multiple skills, then the contact which is routed is the one with the highest skill priority 320S-P.

At step 650, skill priority 320S-P is set based on one or more evaluation objects 450S. That is, instead of a contact center manager inputting the priority for an agent's skill, the WFM component 210 derives the priority from the QM evaluation data. In one embodiment, skill priority 320S-P is set based on the skill measurement 450S in the evaluation object 450 (described above), so that agents who have a high competency on a particular skill are assigned a high priority 320S-P on that same skill. As one example, agents who have high competency in Spanish (e.g., native Spanish speakers) are assigned highest priority for incoming calls from Spanish speakers, and agents who have lower competency in Spanish (e.g., Spanish as a second language) are assigned second priority. As a result, calls from Spanish speakers are routed to the agents with the best Spanish skills, until none of those agents are available, at which time the calls are routed to agents who do speak Spanish, but not as well.

Figure 7:
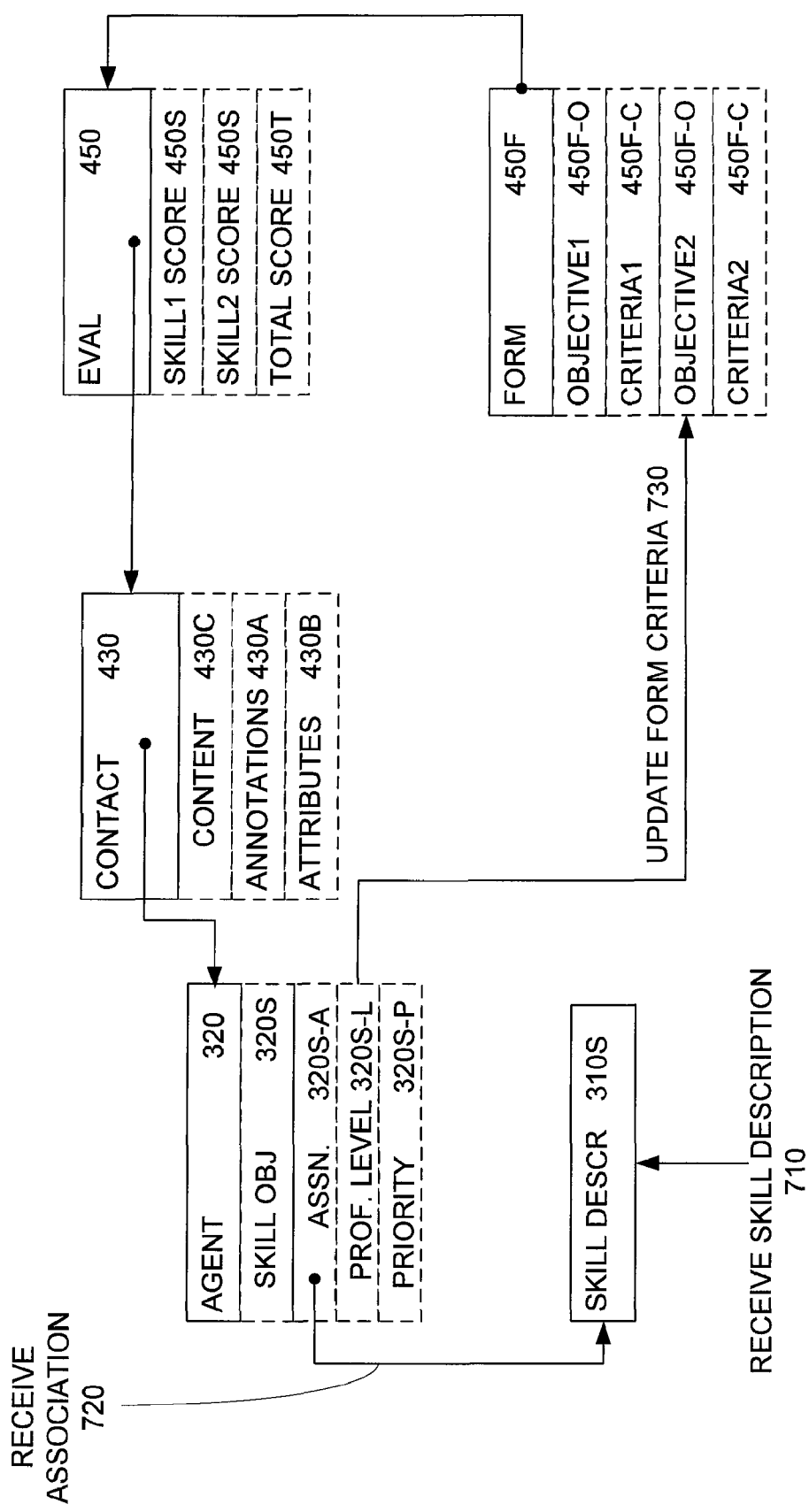
FIG. 7 is an object diagram showing component interactions in yet another embodiment of a method or system of integrating contact evaluations and agent skills.

FIG. 7 is an object diagram showing component interactions in yet another embodiment of a method or system of integrating contact evaluations and agent skills. WFM component 210 receives skill description 310S at step 710 and an association between an agent 320 and skill description 310S at step 720.

When a recorded contact is evaluated, by a person or computer-implemented analytics component, objectives are measured against criteria. For example, an objective for a sales contact might be mentioning a product a certain number of times, and the criteria might be 3 product mentions. These objectives and criteria are stored in a Form object 450F, which is associated with one or more evaluations.

At step 730, the criteria in the Form object 450F is set based on information in the WFM::Agent::Skills object 320S, such as skill competency level 320S-L. For example, the criteria used to evaluate an agent with the highest skill competency (e.g., 5 product mentions) may be harsher than the criteria used to evaluate an agent with less competency (e.g., 3 product mentions).

Figure 8A:
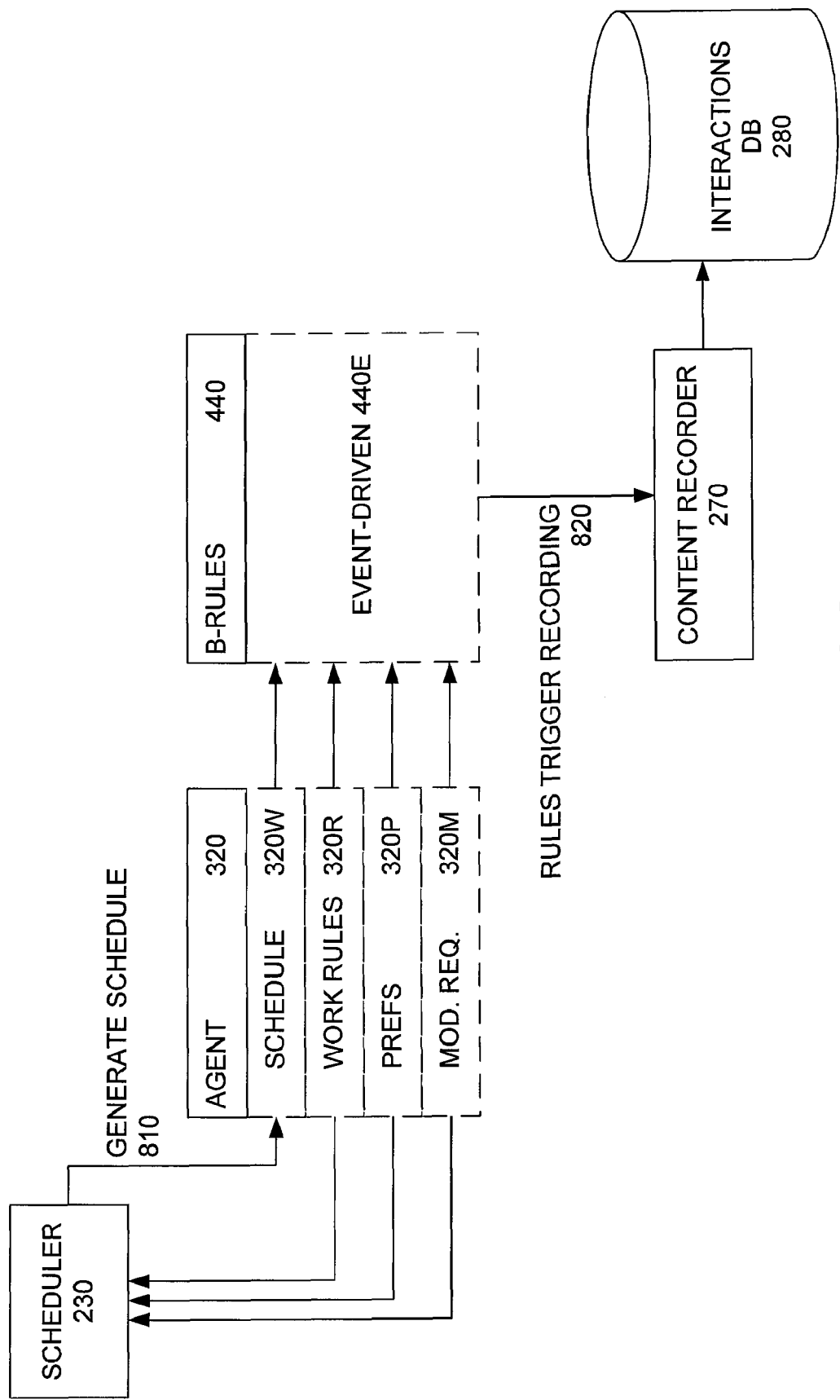
FIG. 8A is an object diagram showing component interactions in one embodiment of a method or system of integrating work force management and contact recording.

FIG. 8A is an object diagram showing component interactions in one embodiment of a method or system of integrating work force management and contact recording. In step 810, scheduler component 230 of WFM component 210 assigns work activities to an agent for a specific time period, producing a schedule 320W that is specific to an agent. When generating an agent schedule, scheduler takes into account work rules 320R, scheduling preferences 320P and schedule modification request objects 320M.

A contact center manager can create event-driven business rules 440E which define when a customer interaction becomes a contact, thus capturing transactions that are of interest to the organization. The rules include conditions which must be met to trigger recording of a contact. In the embodiment of FIG. 8, the conditions used to trigger event-driven business rules 440E include agent-specific schedules (320W), work rules (320R), scheduling preferences (320P), and/or schedule modification requests (320M).

One example of such an event-driven rule 440E is one which triggers contact recording of those agents with certain work rules 320R, such as agents that work 6 consecutive days and those that work 5 consecutive days. By recording based on these conditions, a contact center manager can determine whether agent productivity and/or quality is affected by the number of consecutive days worked.

Another example of an event-driven rule 440E is one which triggers contact recording of those agents with specific schedules 320W, which allows a manager to determine whether productivity and/or quality is affected by schedule. For example, agents with 4×10 schedules (four days, ten hours) can be compared to agents with 5×8 schedules; or agents with weekends off can be compared to agents with weekdays off; or agents that work the midnight shift can be compared to agents that work the early evening shift.

Another example of an event-driven rule 440E is one which triggers contact recording of those agents with certain scheduling preferences 320P, such as weekends off or late start times. In this manner, a contact center manager can determine whether agents who are given a scheduling preference have better productivity and/or quality than those who are not.

Once event-driven business rules 440E have been created using this agent-specific data, Content recorder 270 is triggered (820) by these rules to create recorded contacts 430. The contacts 430 are stored in interactions database 280.

Figure 8B:
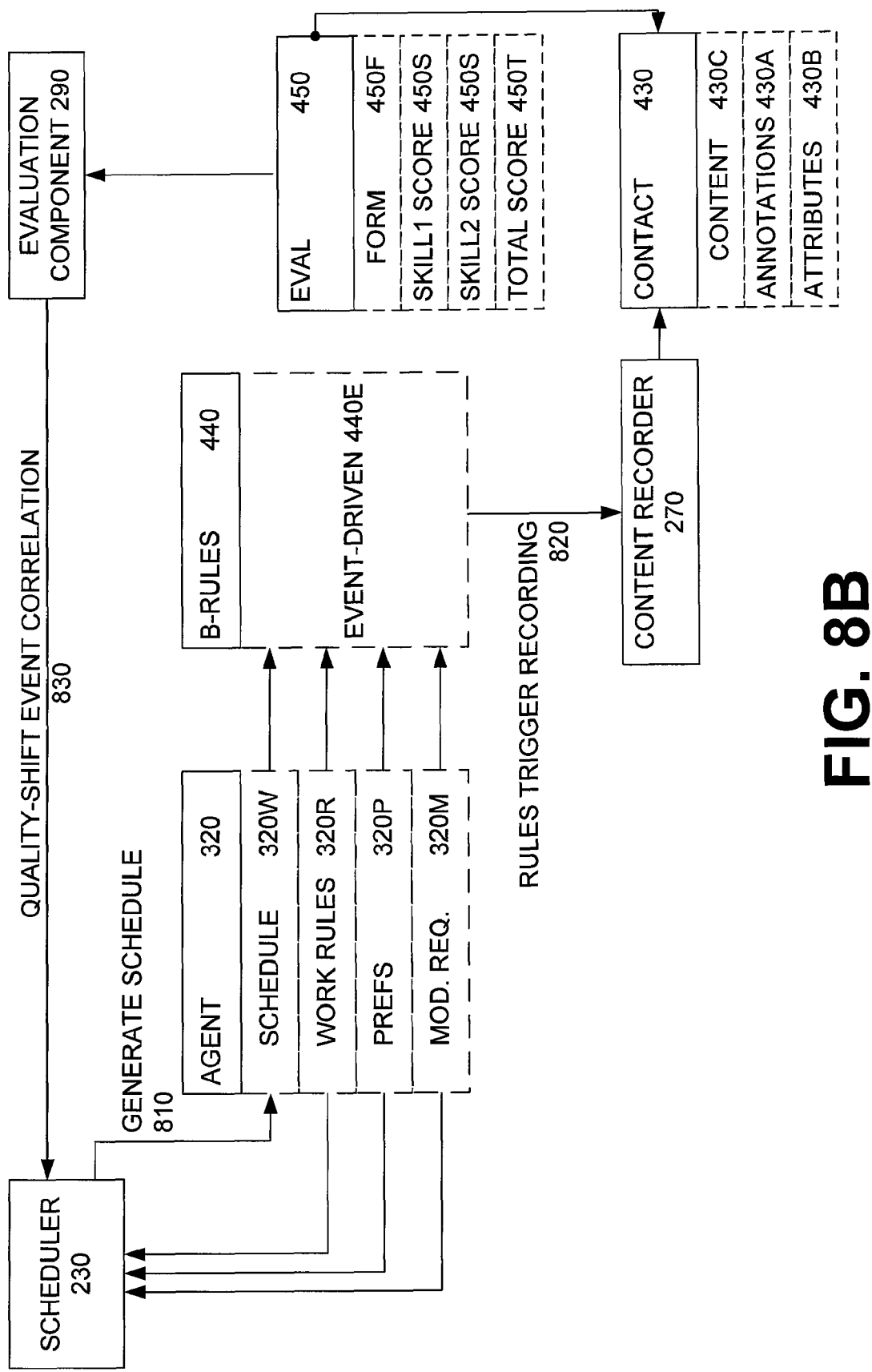
FIG. 8B is an object diagram showing component interactions in another embodiment of a method or system of integrating work force management and contact recording.

FIG. 8B is an object diagram showing component interactions in another embodiment of a method or system of integrating work force management and contact recording. In step 810, scheduler component 230 produces a schedule 320W that is specific to an agent, taking into account work rules 320R, scheduling preferences 320P and schedule modification request objects 320M. Event-driven rule 440E1 triggers (820) recording by Content recorder 270 at regular intervals or at specific events/transitions within an agent's shift, producing recorded contacts 430. Evaluation component 290 examines evaluations (450S) of these recorded contacts 430 to determine a correlation between agent quality on a call and schedule characteristics, such as time-within-shift (e.g., beginning, middle, end of shift) and other events (e.g., returning from breaks, returning from vacation, completing a lesson). The correlation (830) is provided to scheduler 230, so that staffing plans and schedules take this correlation into account and provide improved performance.

Figure 9:
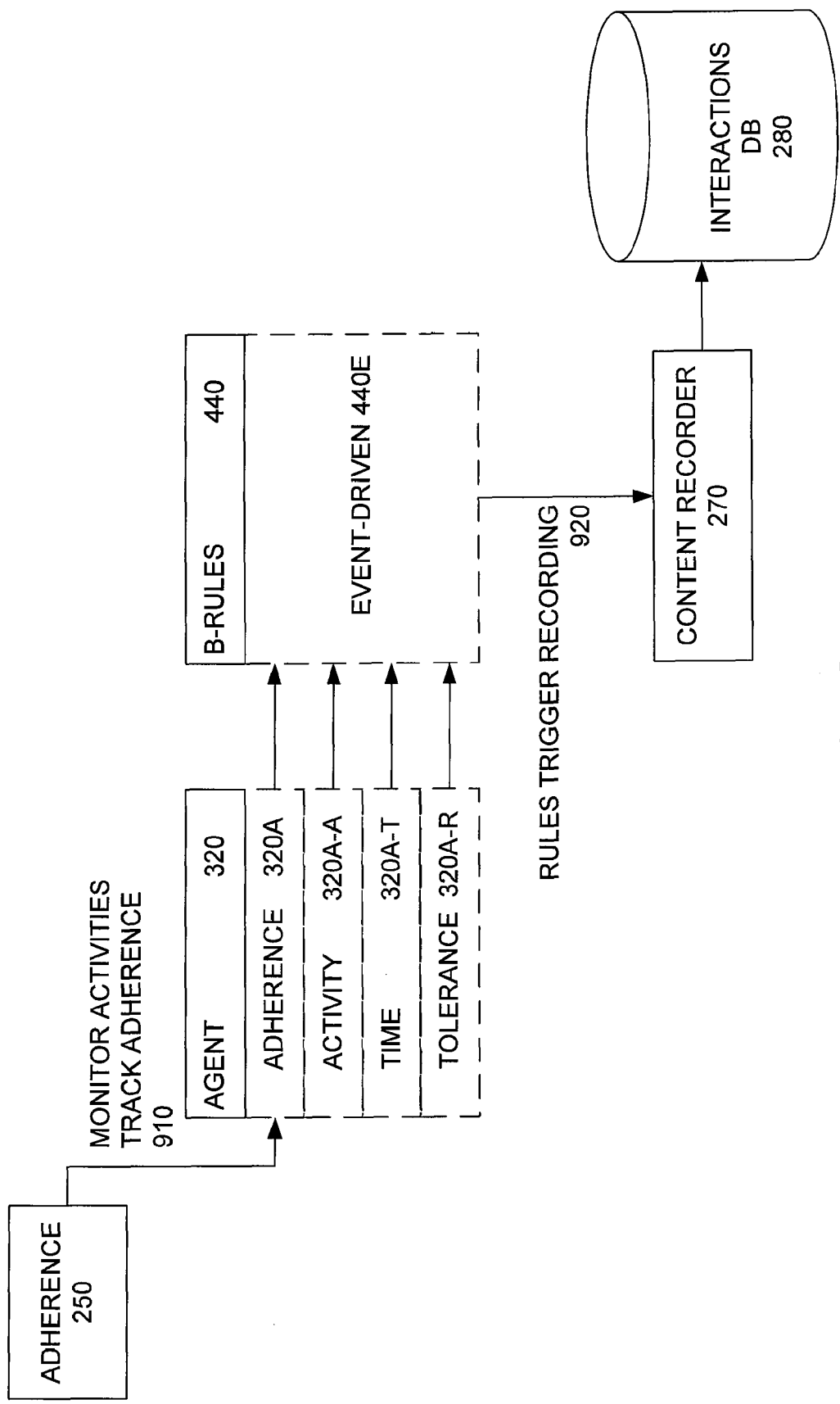
FIG. 9 is an object diagram showing component interactions in another embodiment of a method or system of integrating work force management and contact recording.

FIG. 9 is an object diagram showing component interactions in one embodiment of a method or system of integrating work force management and contact recording. An adherence component 250 of WFM component 210 monitors agent activities and tracks (910) how well agents comply with, or adhere to, contact center policies. In general terms, the function of an adherence subsystem is to determine whether agent activities comply with ("adhere to") call center policies. An instance where an agent activity does not adhere to a policy is an "exception."

Adherence information about a particular agent is available in the adherence object 320A. Adherence object 320A describes what agent activities are out of adherence, for example, the activity type 320A-A (Phone, E-mail, etc.), time the activity went out-of-adherence 320A-T, and the tolerance value 320A-R. Adherence object 320A may also include information about the agent phone and workstation state during the out-of-adherence period.

In the embodiment of FIG. 9, the conditions used by event-driven business rules 440E include adherence information 320A. This allows a contact center manager to trigger recording when an agent goes out-of-adherence. Once event-driven business rules 440E have been creating using adherence data, Content recorder 270 is triggered (920) by these rules to create recorded contacts 430. The contacts 430 are stored in interactions database 280.

In another embodiment (shown) the event-driven business rule 440E that drives content recording specifies a skill competency. Using this type of rule, a contact center supervisor can ensure that more recordings are made of lower-skilled agents. The rate of recording can be reduced as the skill competency level increases.

Figure 10:
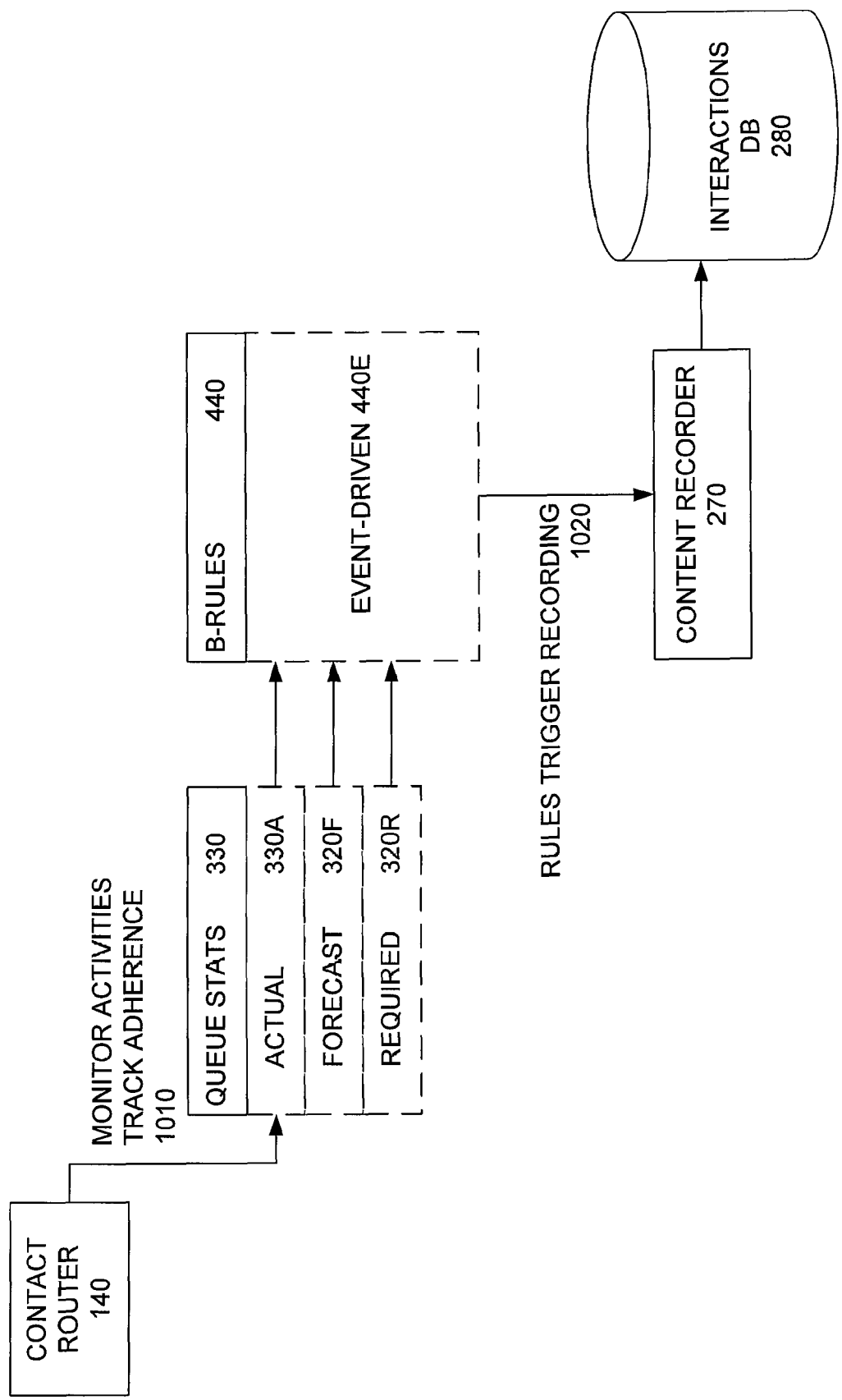
FIG. 10 is an object diagram showing component interactions in another embodiment of a method or system of integrating work force management and contact recording.

FIG. 10 is an object diagram showing component interactions in one embodiment of a method or system of integrating work force management and contact recording. As contacts are routed to various queues and then handled by agents, various types of queue statistics are collected (1010) by queue-specific objects 330. Required statistics 330R store minimum required behavior of a queue. Actual statistics 330A store the actual behavior of a queue. Forecasted statistics 330F store the forecasted behavior of a queue. WFM component 210 monitors several queue statistics throughout the day such as contact volume, average handle time, service level, average speed to answer, hold time in queue, etc. This information is stored in a central database that is accessible by the integrated WFM/QM system. By creating a recording rule that triggers recording when a particular queue statistic reaches a certain threshold, a manager can evaluate agent performance at that threshold.

In the embodiment of FIG. 10, the conditions on which event-driven business rules 440E are triggered include queue-specific statistics 330. This allows a contact center manager to trigger recording on events such as queue average handle time rising above a threshold, queue service level dropping below a threshold, etc. Once event-driven business rules 440E have been creating using queue statistics, Content recorder 270 is triggered (1020) by these rules to create recorded contacts 430. The contacts 430 are stored in interactions database 280. One example of a rule records all contacts when average handle time is greater than 600 seconds for more than 30 minutes. Another example of a rule records all contacts with a queue hold time of greater than 5 minutes, which allows a supervisor to evaluate how agents are handling customers who may be angry or frustrated after being on hold.

Figure 11:
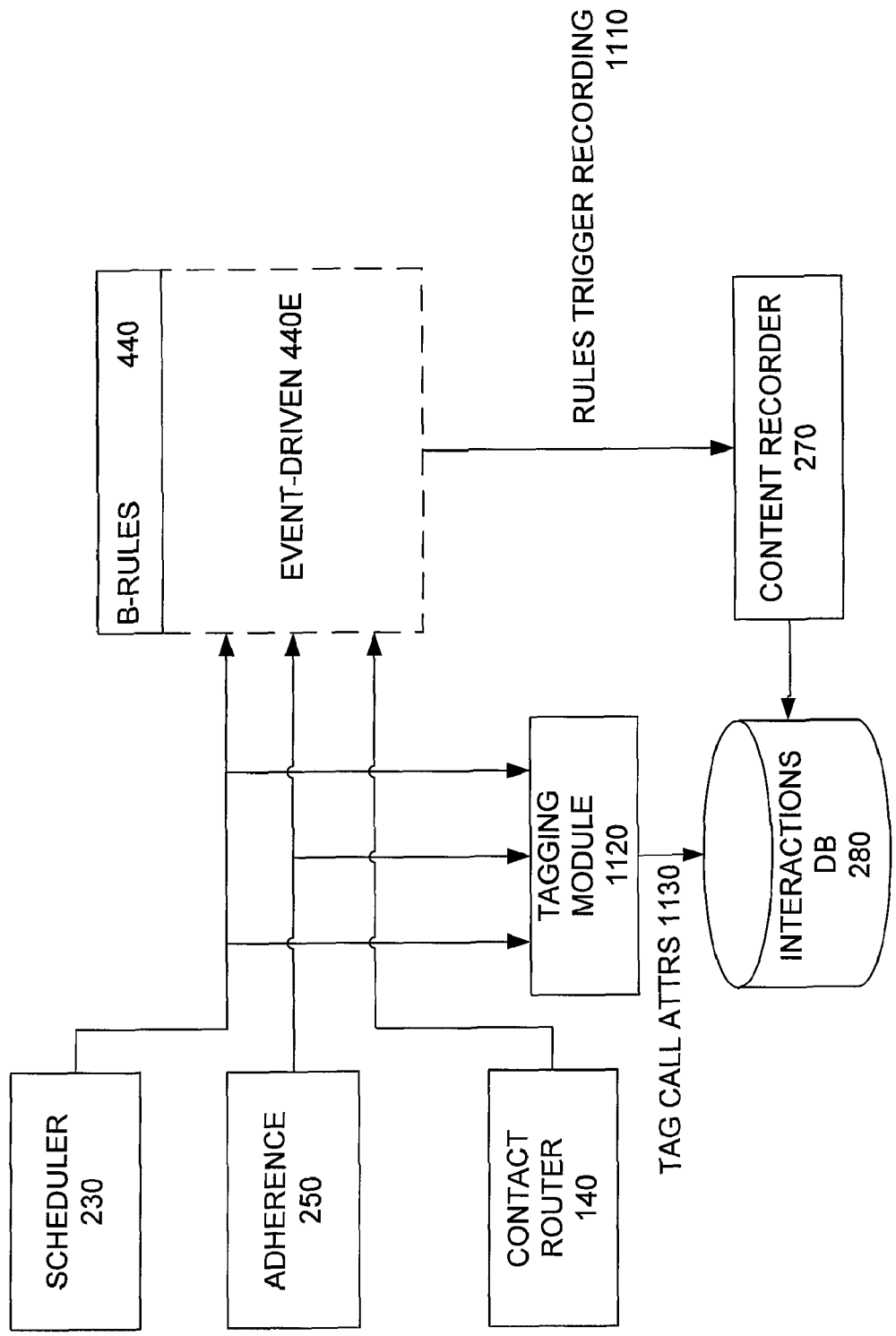
FIG. 11 is an object diagram showing component interactions in another embodiment of a method or system of integrating work force management and contact recording.

FIG. 11 is an object diagram showing component interactions in another embodiment of a method or system of integrating work force management and contact recording. Event-driven business rules 440E are created as described above in connection with FIGS. 8-10, based on scheduler attributes (e.g., time in shift, time of shift, number of consecutive days worked), adherence attributes (e.g., out-out-adherence duration), and/or ACD attributes (e.g., hold time in queue, number of transfers). Content recorder 270 is triggered (1110) by these rules to create recorded contacts 430, which are stored in interactions database 280.

In this embodiment, tagging module 1120 uses these same scheduler, adherence and/or ACD attributes (or combinations thereof to tag (1130) recorded contacts with these attributes. That is, these attributes are stored in assocation with the recorded contact. These stored tags allow a supervisor to search for specific calls and to generate reports that include calls with desired attributes. In this manner, the supervisor can evaluate trends in the quality of agent contacts as a function of the tagged attributes.

Figure 12:
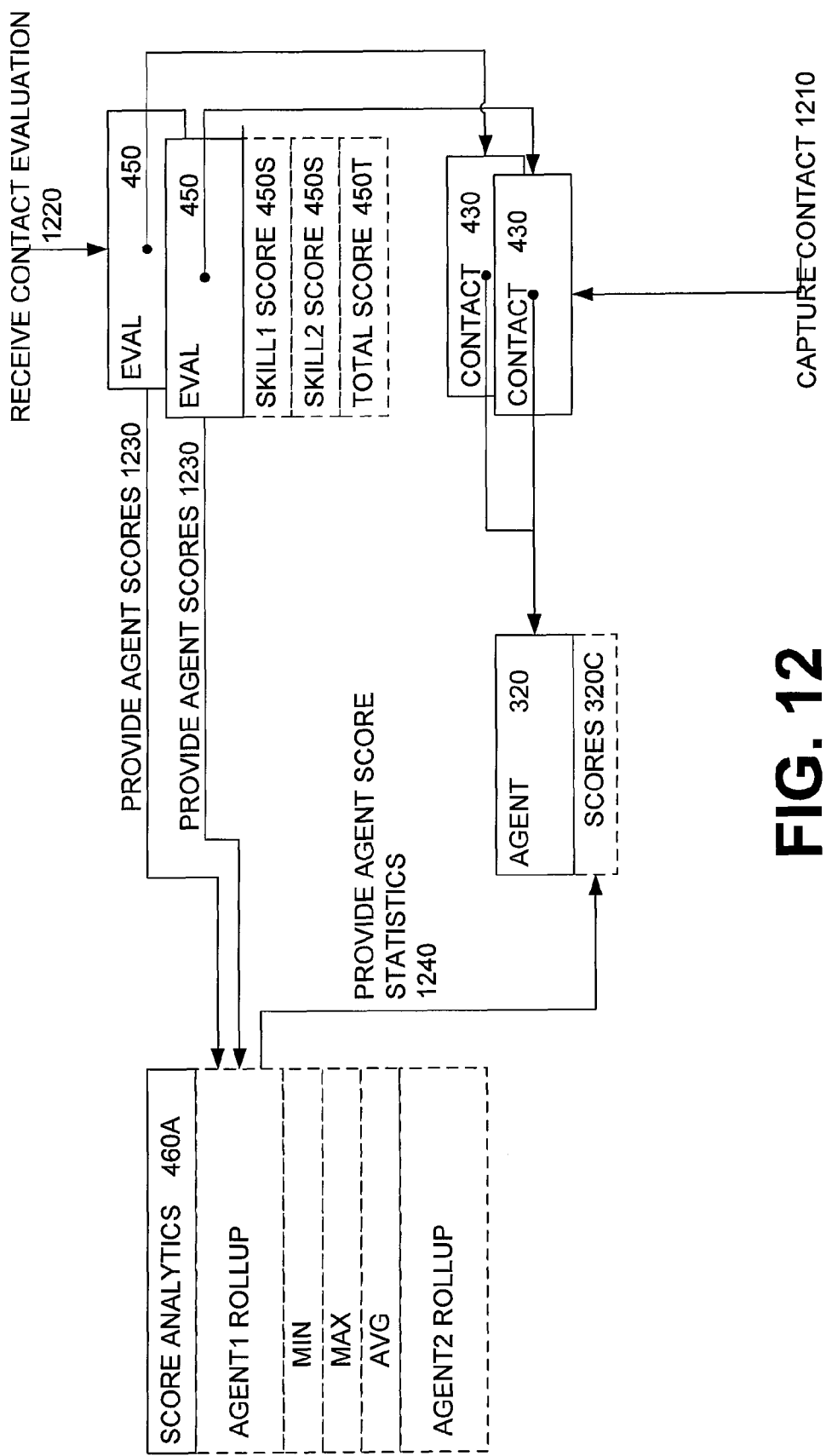
FIG. 12 is an object diagram showing component interactions in another embodiment of a method or system of integrating work force management and quality monitoring.

FIG. 12 is an object diagram showing component interactions in yet another embodiment of a method or system of integrating work force management and quality monitoring. QM 220 captures one or more recorded contacts 430 involving agent 320 through interaction 1210, and receives an evaluation 450 of each contact 430 for that agent 320 through interaction 1220. As can be seen in the object diagram, each contact 430 is associated with an agent 320, and each evaluation 450 is associated with a contact 430. In the example of FIG. 12, two contacts 430 are evaluated for one agent 320, producing two evaluations 450.

Through interaction 1230, QM::Enterprise Reporting::Score Analytics object 460A collects agent scores from the evaluation objects 450, and generates quality statistics on a per-agent basis. Statistics reported by the Score Analytics object 460A are sometimes called "scorecards", and per-agent statistics are sometimes called an "agent rollup." In one embodiment, the generated statistics include minimum, maximum, and average scores across multiple evaluations 450 of one agent 320.

Through interaction 1240, the WFM Agent object 320 receives agent score data from these QM Score Analytics objects 460, and incorporates the data as additional agent attributes. In one embodiment, the score data received by Agent object 320 includes individual scores for particular contacts. In another embodiment, the score data includes statistics such as minimum, maximum and average for a group of contacts made by the agent. Consolidation of this rollup data into the WFM Agent object 320 allows the WFM 220 to provide agent score information in conjunction with other agent information (e.g., agent skills, time records, schedules, and adherence information). For example, agent score information can be displayed in the same WFM view, display, or module as other agent information.

Figure 13:
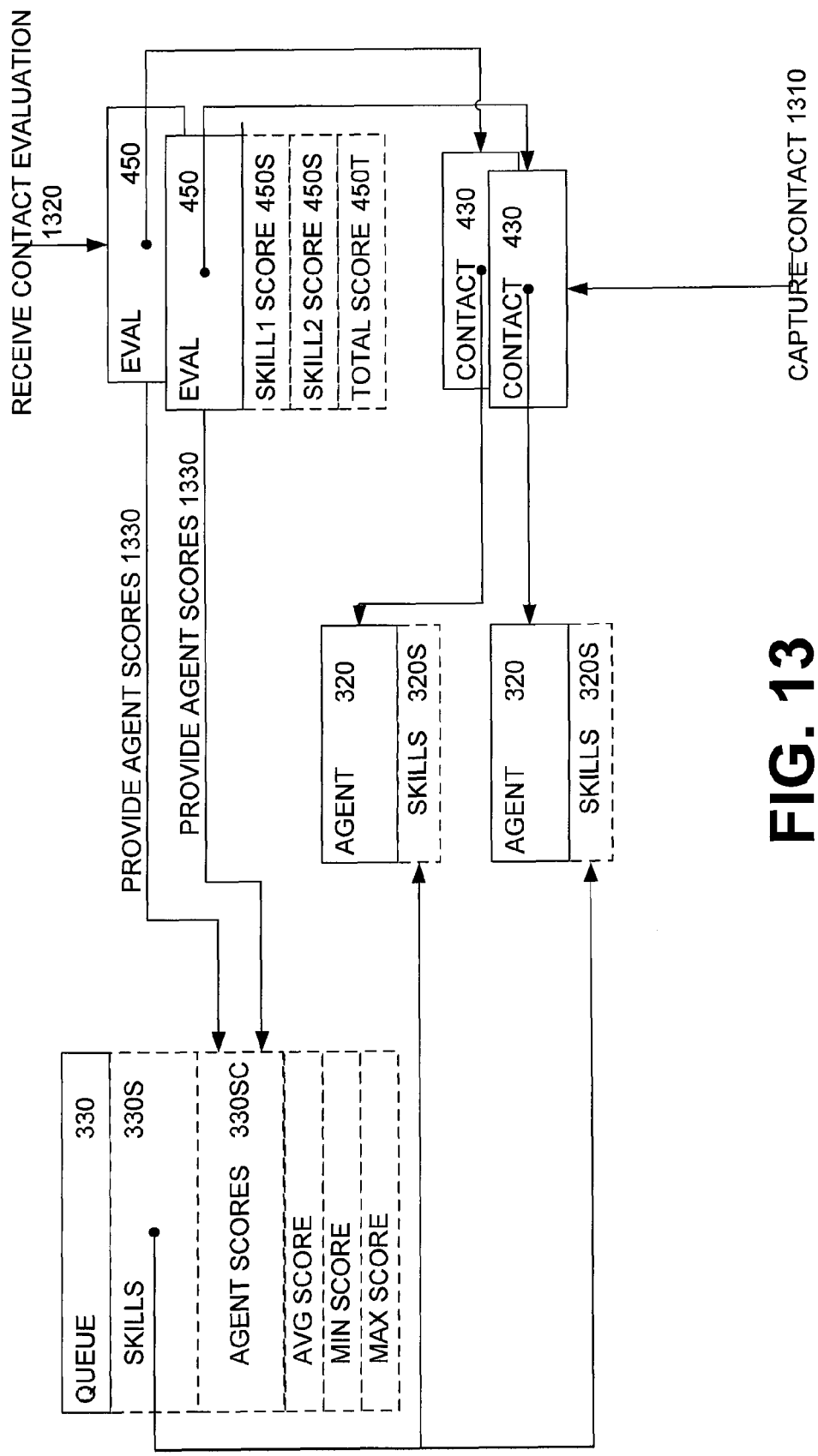
FIG. 13 is an object diagram showing component interactions in another embodiment of a method or system of integrating work force management and quality monitoring.

FIG. 13 is an object diagram showing component interactions in yet another embodiment of a method or system of integrating work force management and quality monitoring. QM 220 captures one or more recorded contacts 430 involving agent 320 through interaction 1310, and receives an evaluation 450 of each contact 430 through interaction 1320. In the example of FIG. 13, two contacts 430 are evaluated for two different agents 320, producing two evaluations 450. Each evaluation 450 includes an overall score 450T.

Contacts 430 are classified into skills, and are then routed to a queue 330 that has been associated with that skill (330S). Once queued, a contact 430 is then handled by an agent 320 who is also associated with that skill (320S). In the example of FIG. 13, the two evaluated contacts 430 are for agents 320 assigned to the same queue 330.

Through interaction 1330, the WFM Queue object 330 receives scores from the evaluation objects 450. The scores are aggregated to produce one or more statistics representing agent quality on a per-queue basis. In one embodiment the statistics include minimum, maximum, and average scores across multiple agents 320 which were scored while servicing a particular queue 330. Consolidation of these queue statistics into the WFM Queue object 330 allows WFM 220 to provide queue-specific scores in conjunction with other queue attributes or information (e.g., actual statistics, required statistics, and forecast statistics). For example, queue-specific score information can be displayed in the same WFM view, display, or module as other queue-specific attributes.

The following is claimed:

1. A computer-implemented method of integrating workforce management and quality monitoring, comprising:
   capturing a plurality of interactions made by an agent;
   selecting contacts from the plurality of interactions based on user-defined business rules that define when an interaction becomes a contact;
   receiving an evaluation of the contacts, the evaluation comprising a measurement of an agent skill, wherein the measurement comprises a competency level;
   updating skill information associated with an agent based on the evaluation, wherein the skill information comprises a priority; and
   setting the priority to a value proportional to the competency level.

2. The method of claim 1, wherein the skill information comprises a competency level.

3. The method of claim 1, wherein the workforce manager component is further configured to receive a description of the agent skill.

4. A computer-implemented method of integrating workforce management and quality monitoring, comprising:
   receiving information about a skill, the skill associated with an agent, wherein the skill information comprises a priority;

capturing a plurality of interactions made by an agent;
selecting contacts from the plurality of interactions based on user-defined business rules that define when an interaction becomes a contact;
receiving an evaluation form for the contacts, the form producing a measurement of the skill, wherein the measurement comprises a competency level;
setting the priority to a value proportional to the competency level; and
updating the form based on the skill information.

5. The method of claim 4, wherein the skill information comprises a competency level, and wherein the form comprises an objective and criteria used to measure compliance with the objective, the method further comprising:
updating the form criteria based on the skill competency.

6. The method of claim 4, further comprising:
receiving a description of the agent skill.

7. A computer-implemented method of integrating a workforce manager and a quality monitor, comprising:
capturing a plurality of interactions, each interaction made by a one of a plurality of agents;
selecting contacts from the plurality of interactions based on user-defined business rules that define when an interaction becomes a contact;
receiving a plurality of scores, each score evaluating one of the contacts;
collecting the plurality of scores associated with a selected one of the agents to produce an agent scorecard;
incorporating at least a portion of the scores within the agent scorecard as attributes of the selected agent within the workforce manager; and
incorporating individual scores that evaluate a selected one of the contacts made by the selected agent.

8. The computer-implemented method of claim 7, wherein the collecting further comprises:
generating statistics for the plurality of scores to produce the agent scorecard.

9. The computer-implemented method of claim 7, further comprising the step of:
determining the average, minimum, or maximum from the collected plurality of scores.

10. The computer-implemented method of claim 7, further comprising:
displaying the agent scorecard data within the workforce manager.

11. The computer-implemented method of claim 7, further comprising:
displaying scorecard attributes of the selected agent in conjunction with other workforce manager attributes of the selected agent.

12. A computer-implemented method of integrating a workforce manager and a quality monitor, comprising:
capturing a plurality of interactions, each interaction distributed to one of a plurality of queues and handled by one of a plurality of agents;
selecting contacts from the plurality of interactions based on user-defined business rules that define when an interaction becomes a contact;
receiving a first score evaluating quality of one of the contacts distributed to a selected one of the queues;
receiving a second score evaluating quality of another one of the contacts distributed to the selected queue;
aggregating, in the workforce manager, the first and the second score to produce at least one statistic representing quality of contacts for the selected queue; and
determining the average, minimum, or maximum statistics from the first and second scores.

13. The computer-implemented method of claim 12, further comprising:
displaying the first score of the selected queue within the workforce manager.

14. The computer-implemented method of claim 12, further comprising:
displaying the first score of the selected queue in conjunction with other workforce manager attributes of the selected queue.

* * * * *